(12) United States Patent
Campbell et al.

(10) Patent No.: US 8,475,160 B2
(45) Date of Patent: Jul. 2, 2013

(54) LOW EMISSIONS COMBUSTION APPARATUS AND METHOD

(75) Inventors: Paul Andrew Campbell, Clarendon (JM); David Hagen, Goshen, IN (US)

(73) Assignee: Vast Power Portfolio, LLC, Elkhart, IN (US)

( * ) Notice: Subject to any disclaimer, the term of this patent is extended or adjusted under 35 U.S.C. 154(b) by 224 days.

(21) Appl. No.: 12/850,756

(22) Filed: Aug. 5, 2010

(65) Prior Publication Data

US 2010/0319594 A1  Dec. 23, 2010

Related U.S. Application Data

(62) Division of application No. 11/149,959, filed on Jun. 10, 2005, now Pat. No. 7,788,897.

(60) Provisional application No. 60/579,135, filed on Jun. 11, 2004, provisional application No. 60/590,073, filed on Jul. 21, 2004.

(51) Int. Cl.
*F23L 7/00* (2006.01)
*F23M 3/04* (2006.01)
*F23N 1/02* (2006.01)
*F02G 3/00* (2006.01)
*F02C 7/22* (2006.01)
*F23B 90/00* (2011.01)
*F23N 5/18* (2006.01)

(52) U.S. Cl.
USPC .............. 431/2; 431/10; 431/12; 60/39.26; 60/39.3; 60/747; 60/776; 110/341; 110/186

(58) Field of Classification Search
USPC .............. 431/10, 12; 60/39.26, 39.3, 747, 60/776; 110/341, 186
See application file for complete search history.

(56) References Cited

U.S. PATENT DOCUMENTS

| | | | |
|---|---|---|---|
| 3,946,553 A | 3/1976 | Roberts et al. | 60/737 |
| 4,112,676 A | 9/1978 | DeCorso | 60/733 |
| 4,735,052 A | 4/1988 | Maeda et al. | 60/773 |
| 4,893,468 A | 1/1990 | Hines | 60/775 |
| 4,910,957 A | 3/1990 | Moreno et al. | 60/773 |
| 5,319,935 A | 6/1994 | Toon et al. | 60/733 |

(Continued)

FOREIGN PATENT DOCUMENTS

| | | |
|---|---|---|
| EP | 0 314 112 | 5/1989 |
| EP | 0 319 246 | 6/1989 |
| EP | 1 055 879 | 11/2000 |

OTHER PUBLICATIONS

Pavri et al., GE Energy Services, "Gas Turbine Emissions and Control", Mar. 2001, GER-4211, pp. 1-32.

(Continued)

*Primary Examiner* — Kenneth Rinehart
*Assistant Examiner* — William Corboy
(74) *Attorney, Agent, or Firm* — Ostrolenk Faber LLP

(57) ABSTRACT

Clean combustion and equilibration equipment and methods are provided to progressively deliver, combust and equilibrate mixtures of fuel, oxidant and aqueous diluent in a plurality of combustion regions and in one or more equilibration regions to further progress oxidation of products of incomplete combustion, in a manner that sustains combustion while controlling temperatures and residence times sufficiently to reduce CO and NOx emissions to below 25 ppmvd, and preferably to below 3 ppmvd at 15% $O_2$.

25 Claims, 11 Drawing Sheets

U.S. PATENT DOCUMENTS

| | | | |
|---|---|---|---|
| 5,584,684 A | 12/1996 | Dobbeling et al. | 431/285 |
| 5,623,819 A | 4/1997 | Bowker et al. | 60/776 |
| 5,895,211 A | 4/1999 | McMillan | 431/10 |
| 6,263,663 B1 | 7/2001 | Grienche et al. | 60/794 |
| 6,418,724 B1 | 7/2002 | Cheng | 60/775 |
| 6,564,556 B2 | 5/2003 | Ginter | 60/775 |
| 6,584,775 B1 | 7/2003 | Schneider et al. | 60/775 |
| 2002/0043067 A1 | 4/2002 | Maeda et al. | 60/776 |
| 2003/0014959 A1* | 1/2003 | Ginter | 60/39.26 |
| 2003/0152879 A1 | 8/2003 | Fischer et al. | 431/8 |

OTHER PUBLICATIONS

International Search Report for Application No. PCT/US2005/020503 (the PCT counterpart of the parent application).

Day, et al., "HAT Cycle Technololgy Development Program," DOE Contract No. DE-AC21-96MC33084, Advanced Turbine Systems Annual Program Review Meeting Nov. 8-10, 1999.

* cited by examiner

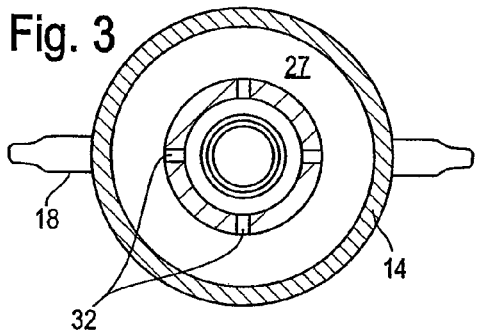
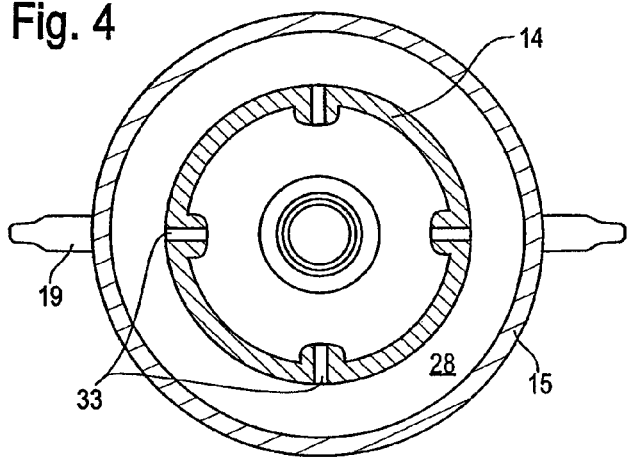
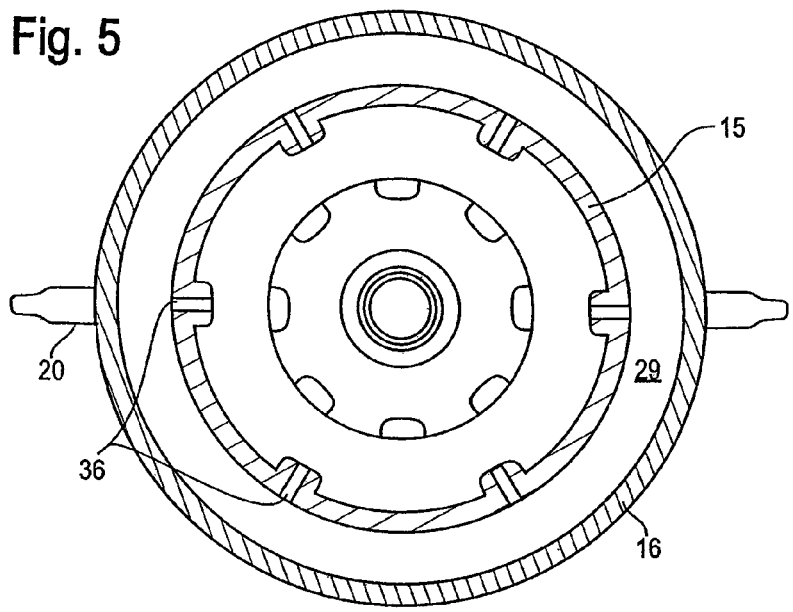

LOW EMISSIONS COMBUSTION APPARATUS AND METHOD

CROSS REFERENCE TO RELATED APPLICATIONS

This application is a divisional of application Ser. No. 11/149,959 filed Jun. 10, 2005, which is based on and claims the priority of U.S. Provisional Application No. 60/579,135, filed Jun. 11, 2004 and U.S. Provisional Application No. 60/590,073, filed Jul. 21, 2004, the entire contents of which are hereby incorporated by reference.

BACKGROUND OF THE INVENTION

1. Field of the Invention

The invention relates to an apparatus and method of combustion that produces low emissions, carbon monoxide and oxides of nitrogen in particular, and to progressing reactions to produce low intermediate products and byproducts.

2. Description of the Related Art

Energy conversion and chemical processing industries, seek to economically remove and/or produce specific chemical species. Unburned hydrocarbons (UHCs), carbon monoxide (CO), and oxides of nitrogen (Nox) are three sets of chemical species which are commonly found in energetic fluids formed in hot chemical reactions, and more particularly, in combustion-based energy conversion industries.

Legislative authorities have periodically reduced allowable emission levels of these pollutants. Manufacturers of combustion-based power and other energy-conversion systems thus seek improved pollutant reduction systems. Methods of reducing the emissions of these and other common pollutants typically include, (1) modifying the combustion process itself, e.g., tuning or configuring the combustor/burner section of the system, or adding reactants to reduce the emissions (such as ammonia), and (2) utilizing add-on technologies that effectively reduce or remove pollutant species produced in earlier phases of the overall chemical or energy-conversion process.

In typical combustion systems, control measures aimed at controlling each of NOx, CO and UHCs can be counterproductive, thus increasing the cost and complexity of controlling overall emissions. For example, NOx emissions are understood to increase with, (1) increasing combustion temperatures, becoming especially important above about 1300°-1500° C., (2) with increasing residence time at the NOx-producing temperatures, and (3) with increasing concentrations of the effective oxidant, typically $O_2$, at the NOx-producing temperatures. Consequently, some of the most common in-situ or "in-combustor" strategies for reducing NOx levels are informed by these understanding. They sometimes involve adding a diluent, such as excess air, exhaust gas, steam or water, to reduce undesirably high temperatures in the combustor. Furthermore, the more upstream the diluent is delivered to the combustor, the shorter the residence time at NOx-producing temperatures. In some technologies diluent air and/or steam is premixed with the fuel and/or oxidant containing fluid to constrain the peak reaction or combustion flame temperatures. To reduce the amount of oxidant available that would oxidize nitrogen-containing compounds to form NOx, diluents other than air, oxygen or similar oxidants are used.

It is commonly expected that CO and UHC emissions increase with decreasing overall combustor temperatures and reduced residence times at temperatures high enough to promote UHC and CO oxidation to $CO_2$. Consequently, diluent-based NOx reduction strategies typically result in simultaneous undesired increases in the CO and UHC emissions in the energetic or working fluid leaving the combustor, and vice versa. Furthermore while higher temperatures seem to promote UHC removal, CO emissions tend to increase with incremental increases in temperature in high temperature ranges. This is especially a problem as higher turbine inlet temperatures are sought for higher efficiency in gas turbine systems. The CO levels produced from systems with high combustor exit/Turbine Inlet temperatures are often substantially higher than legislatively allowed or desired emission levels.

Efforts to increase system throughput typically result in shorter hot residence times, further raising UHC and CO concentrations. Rapid expansion through a work engine or expander such as a turbine typically results in rapid reductions in fluid temperature that "freeze" or "quench" the conversion of UHC and CO to $CO_2$, which can result in high UHC and CO emissions.

As in-situ methods typically have limited success in reducing emissions, they are often combined with add-on technologies that reduce or remove pollutant species produced and present in the combustion product gases, e.g. selective catalytic reduction (SCR). Such add-on techniques typically process the exhaust gases at low pressures. The utilized add-on technologies often substantially increase the volume, footprint and cost of the systems because of the high specific volume and comparatively long kinetic time-scales of reactions that characterize exhaust gases. Thus, even though these methods may successfully reduce emissions to acceptable levels, they often substantially increase equipment, operation and maintenance costs.

SUMMARY OF THE INVENTION

One object of the present invention is configure and control the combustion of a carbonaceous fuel using significant levels of aqueous diluent to control combustion temperatures and the consequent production of NOx, at the same time maintaining stable combustion through the staged, progressive addition of air, fuel, and diluent to the hot combustion gases.

Another object is to control the production of partial products of combustion such as CO, by the use of one or more equilibration stages, wherein the temperatures and residence times are controlled to promote the conversion of CO to $CO_2$.

More generally, the objects of this invention are the minimization of by product species and partial reaction species, in a chemical reaction, using the steps of progressive, diluted primary reaction, followed by control within equilibration stages. The combustion-based embodiments of the present invention exemplify methods of fluid delivery to the primary combustion region and preferentially include equilibration regions or passages.

The strategy of Progressive Combustion is employed within the primary combustion region-to constrain combustion below temperatures that are normally achieved in conventional combustion systems. Progressive combustion is able to support stable combustion of common hydrocarbon fuels at average temperatures in the primary combustion region as low as 650° C., well below the lower temperature limit of significant NOx formation of about 1300° C. Gases leaving the primary combustion region of a combustor may have higher than acceptable UHCs and/or CO concentrations. Consequently, after primary combustion is accomplished, final burnout is achieved in equilibration regions where temperature or temperature profiles are established that support rapid removal of UHCs and/or CO, decreasing their concentrations to levels not achievable in conventional combustion regions. These equilibration region controls may be applied after progressive combustion, or after other primary combustion techniques, whether conventional or novel.

The main design elements of Progressive Combustion include (1) streamwise distribution of fluid delivery and (2) improved mixing or premixing. When applied to an exemplary combustor configuration, the Progressive Combustion principle results in (1) improved stability, (2) improved peak temperature control, (3) and improved chemistry/kinetic control and emission reduction, when compared with conventional technologies. The methods may enable mixtures, conventionally considered as non-flammable, to be burned in a controlled and stable fashion without blowout.

As energetic combusting fluid flows through the combustion chamber, mixtures of oxidant, fuel and diluent fluids are delivered to the combustion chamber so that the delivered fluids interact with the hot combusting fluid at a plurality of locations along the streamwise dimension of the combustor. The progressive combustion sequence is initiated by energetic pilot fluids at the upstream end of the combustion chamber, the outflow of the pilot being the inflow of the first combustion stage. At each stage, prescribed quantities of uncombusted of oxidant, fuel and diluent fluid mixtures are delivered to the combustion chamber, mixed together, and energized by heat from the outflow of the previous combustion stage to temperatures that support their ignition and the release of their chemical energies of combustion. The energetic fluids produced by this combustion form the outflow of the current stage and the inflow of the next. In the design limit, the distribution of delivery locations may be treated as a continuous distribution rather than discrete locations.

Progressive Combustion generally applies to the upstream primary combustion region, where most or a significant fraction of the total fuel, air and/or water used is delivered to the combustion chamber, or where most or a significant fraction of the overall exothermic release of chemical energies occurs. Further downstream, equilibration regions may be used to further lower UHC and CO concentrations to target levels. In the equilibration regions, the thermodynamic equilibrium relationship between CO, $CO_2$ and $O_2$, characterized by lower CO equilibrium levels at lower temperatures, is exploited. Consequently, after excess levels of CO and UHC are oxidized to $CO_2$ in the primary combustion regions, the temperature of the energetic fluid is controlled in one or more of the provided equilibration regions. The fluid temperature within the equilibration region is controlled to be low enough to encourage CO concentrations in the hot combustion fluids to approach the lower equilibrium levels, while being high enough to support high enough reaction rates to the equilibrium level.

Accordingly, in the current invention, equilibration region(s) are preferably provided or configured downstream of the primary combustion region(s) to reduce the high CO emissions common in power systems. These equilibration regions (1) establish one or more desired equilibration temperatures, temperature ranges or temperature paths, and (2) provide one or more corresponding equilibration residence times sufficient to reduce the CO concentration to desired levels at the end of the equilibration residence times.

In some configurations, the fluid equilibration temperature is configured and/or controlled to between about 850° C. and 1450° C., and more preferably between about 1050° C. and 1250° C. for typical hydrocarbon-air based combustion systems, depending on the target emissions levels. These temperatures are typically below temperatures that form significant NOx emissions. To achieve the same CO concentrations for different mixture conditions, users generally choose higher equilibration temperatures as the concentration of excess oxygen in the system increases, as the carbon fraction of the fuel decreases, or as the fluid pressure in the system increases.

According to the combustion system objectives and/or design limitations, users preferably provide the equilibration temperature and appropriate equilibration residence time within the equilibration region(s) by one or more energy transfer mechanisms. These energy transfer mechanisms may include, but are not limited to:

Adding of further diluent to the combustion fluid flow;
Accelerating the combustion fluid flow;
Extracting energy from the combustion fluid flow using a turbine; and/or
Transferring heat from the combustion fluid flow by one or more of convection, conduction and/or radiation.

According to different energy-conversion system objectives and/or design limitations, (e.g., the Turbine Inlet Temperature for gas turbines) users preferably add equilibration regions in sequential arrangement downstream of progressive combustion regions. Additional emissions control strategies may be incorporated into the overall system as desired. Other chemical processes may also be conducted using similar methods.

BRIEF DESCRIPTION OF THE DRAWINGS

FIG. 3 is section A-A of FIG. 2, schematically depicting a transverse cross-section through the stage 1 combustion region.

FIG. 4 is section B-B of FIG. 2, schematically depicting a transverse cross-section through the stage 2 combustion region.

FIG. 5 is section C-C of FIG. 2, schematically depicting a transverse cross-section through the stage 3 combustion region.

DETAILED DESCRIPTION OF THE PREFERRED EMBODIMENT

U.S. Pat. Nos. 3,651,641, 5,617,719, 5,743,080 and 6,289,666 to Ginter are hereby expressly incorporated by reference herein. These teach diluted combustion methods utilizing delivery of thermal diluent (such as water) into a combustor to cool the combustion, reducing the use of excess dilution air. This invention further expressly incorporates by reference herein the following US Patent applications by Hagen et al.:

20050056313 Method and apparatus for mixing fluids of Mar. 17, 2005

20040244382 Distributed direct fluid contactor of Dec. 9, 2004

20040238654 Thermodynamic cycles using thermal diluent of Dec. 2, 2004 and

20040219079 Trifluid reactor of Nov. 4, 2004. These applications teach further methods of delivering aqueous diluent with improved control over transverse temperature profiles.

Figure 1:
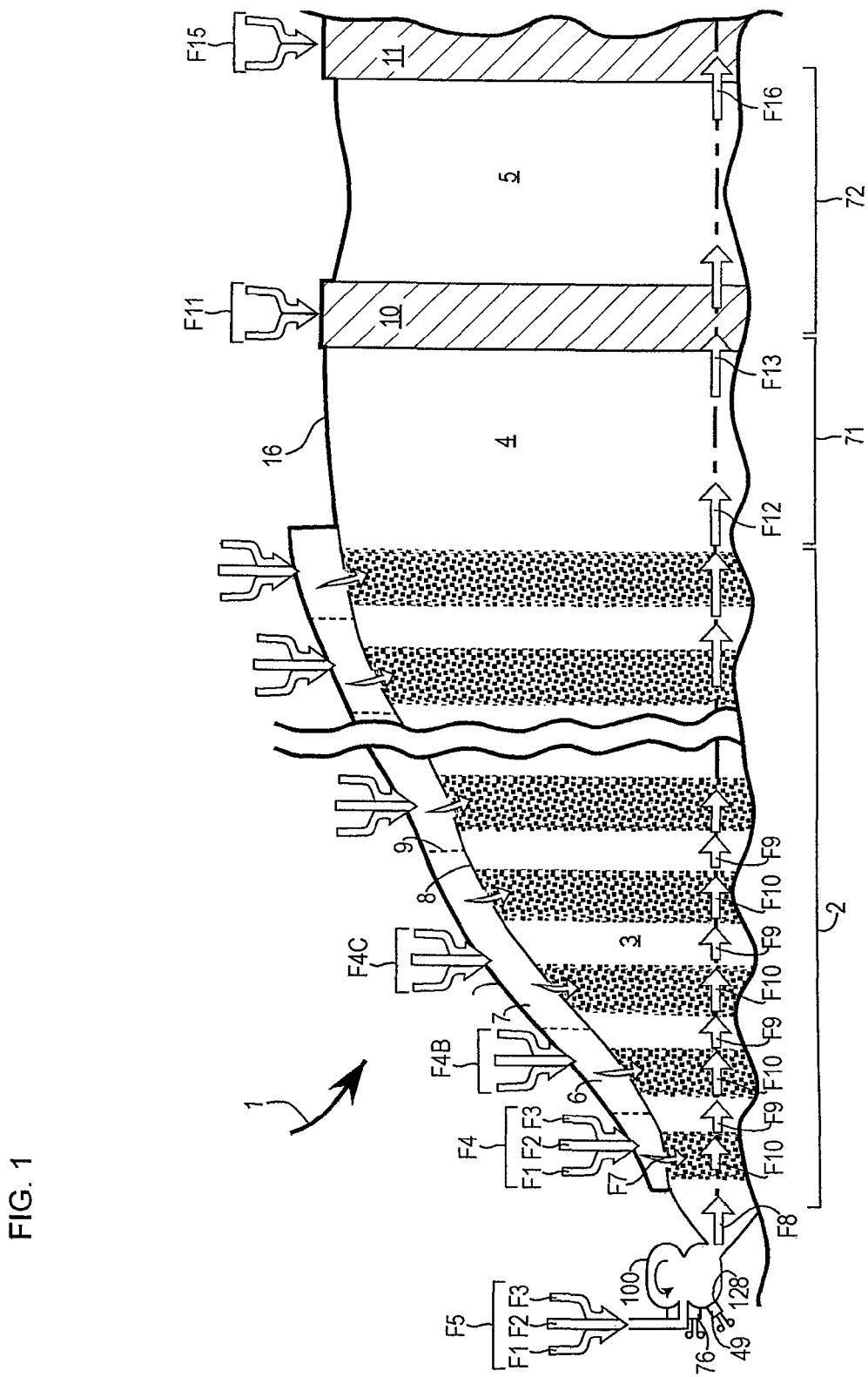
FIG. 1 schematically depicts an exemplary generalized embodiment of a combustor utilizing progressive combustion and equilibration strategies to achieve emissions control.

FIG. 1 is a generalized representative embodiment of a combustor apparatus utilizing the Progressive Combustion and Equilibration methods to control emissions. The figure depicts Progressive Combustion within a combustor 1 comprising a combustion chamber 2 having a plurality of streamwise combustion regions in fluid communication, and having a plurality of discrete streamwise fluid delivery locations. Other configurations may use continuous streamwise delivery or numerous delivery locations providing pseudo continuous streamwise delivery.

The energetic combustor fluids F9 are characterized at the upstream end of the combustion chamber 2 by entering energetic pilot fluids F8. Downstream of the entrance of the pilot fluids F8 to the combustion chamber 2, prescribed quantities of oxidant F1, fuel F2 and diluent F3 fluid mixtures are delivered to the combustor 1. After delivery, uncombusted fluids F4 comprising the oxidant F1, fuel F2 and diluent F3 fluids are preferably mixed within one or more premixing regions 6, forming an uncombusted premix F7. The uncombusted premix fluid F7 is preferably mixed with the energetic pilot fluids F8 to form an energized combustible mix F10. Energy available from the energetic pilot fluids F8 contributes to the energizing the uncombusted premix F7, heating it to temperatures that support its ignition and the release of its chemical energies of combustion.

Delivering uncombusted premix fluid F7 is preferably combusted to form energized combustible mix F10. This results in an increased mass, volume and enthalpy flow of energetic combustor fluids F9 compared to the initial inflow of energetic pilot fluids F8 into that combustion stage. Additional quantities of the uncombusted fluids F4 are preferably delivered to the combustion chamber 2 in a similar manner, being added at a plurality of locations along the streamwise dimension of the chamber 2. At each delivery location, uncombusted fluids F4 are preferably combine and are delivered to mixing regions 6. The resulting premix fluid F7 is then incorporated with energetic combustor fluids F9. These are at temperatures higher than that of the premix fluid F7, to form an energized combustible mix F10. The constituents of the energized combustible mix F10 will then be about at temperatures that support their combustion. This method results in increased mass, volume and enthalpy flows of energetic combustor fluids F9 from one combustion stage into the next. In the design limit, the distribution of delivery locations may be treated as a continuous distribution rather than discrete locations.

In some configurations, more than one of the stages in the Progressive Combustion sequence are fed by a common premixing region 7. The proportions of the oxidant F1, fuel F2 and diluent F3 constituents being fed to stages with a common premixing region 7 are about the same giving similar compositions.

In some configurations, no clear boundary 8, such as a physical wall, demarcates the premixing region 6. Consequently, there may not be a distinct separation of the premixing regions 6 from regions of high combustion reactivity where the energetic combustor fluids F9 and energized combustible fluids F10 are situated.

Throughout the progressive combustion sequence, the temperature, composition, and streamwise delivery profile of the fluids forming the premix F7 may be controlled so that:

The temperature of the premix fluids F7 within the premixing region(s) 6 are below temperatures that would support their spontaneous combustion. In configurations where there is a physical partition 8 between the premixing region 6 and the combustion regions 40 to 48, such temperature control may prevent flashback. In configurations where the premixing region 6 is within the confines of the combustion chamber 2 so that no physical partition separates the premix fluids F7 from the high combustion reactivity in fluids F9 and F10, such temperature control deters premature combustion before delivered fluids F4 are completely premixed. Combustion prior to full premixing is preferably avoided to deter formation of localized pockets or regions within the combustion region where the chemistry of the oxidant:fuel:diluent mix could result in undesired phenomena such as high temperatures regions, and consequently, high NOx formation rates.

When the premix fluids F7 are combined with the energized combustor fluids F9, they form an energized combustible fluid F10 that has a temperature that is preferably high enough to support its spontaneous stable combustion.

The fluid composition including diluent are preferably configured to achieve a desired adiabatic combustion temperature. The resulting temperature of the energetic combustor fluids F9 is preferably controlled within a certain prescribed temperature range. Examples of such temperature constraints include avoiding temperatures that support high NOx formation rates, or operating at temperatures within design limits for system hardware. E.g., the maximum temperature of turbine blades further downstream or the maximum temperature of adjacent combustor walls.

The end of the primary combustion region may be characterized by a final delivery stage, wherein the remaining uncombusted fluids F4 of the progressive combustion sequence are mixed with the energetic combustor fluids F9, forming the primary combustion region's 3 last batch of energized combustible fluids F10.

With continued reference to FIG. 1, the energetic combustor fluids F12 formed in the last stage of the progressive combustion sequence may at first have high levels of UHC and CO. e.g., due to an incomplete breakdown and oxidation of UHCs to CO and insufficient CO oxidation to $CO_2$. These combustor fluids F12 exiting the primary combustion region 3 are preferably delivered to one or more downstream equilibration regions 4. These preferably have sufficient residence time for concentrations of species in the combustion product fluids F12 to approach the equilibrium levels corresponding to the local temperature and pressure of the system.

If the combustion product fluids F13 leaving the first equilibration region 4 have CO concentrations above target levels, a fluid control device 10 may be used to adjust the temperature of the combustion product fluids F13. The temperature is typically lowered, thus establishing new lower equilibrium level for CO concentrations to approach. A second equilibration region 5 may follow the first fluid control device 10. Here sufficient residence time may be provided to allow the concentration of species in the combustion product fluids F16 to approach lower equilibrium levels corresponding to the lower local temperature and pressure of the system.

The fluid control device 10 may also incorporate a means to deliver fluids F11, typically oxidant and/or diluent fluids to the combustion product fluids F13. In addition to changes in fluid temperature and species concentrations, the equilibrium change device 10 may also result in a change in fluid pressure. If further reduction in the concentration of CO or another intermediate reaction species is desired after the second equilibration stage 5, one or more further fluid control devices 11 may be used to adjust one or both of the composition and adiabatic temperature of the combustion product fluids F16. Further diluent or heat exchange may be provided to control the hot combustion fluid temperature within or at the system outlet. (e.g. establishing turbine inlet temperatures). E.g., the hot fluid entering the expander is preferably delivered at a temperature of at least 950° C. Accordingly, at the end of the progressive combustion and equilibration sequences, the concentrations of select species, especially NOx, CO and UHCs, are preferably reduced to target levels.

Figure 2:
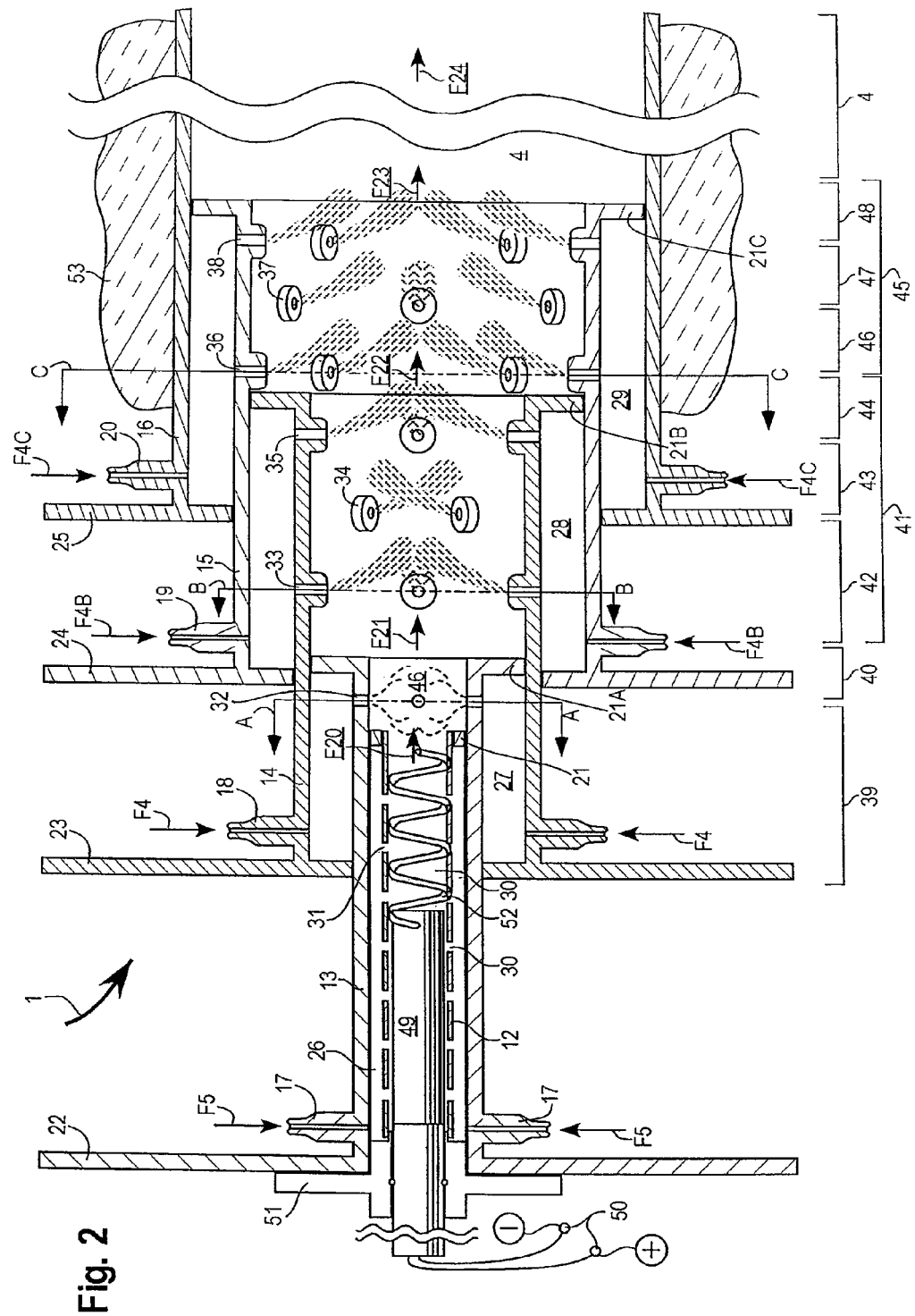
FIG. 2 schematically depicts the longitudinal cross-section of an exemplary embodiment of an experimental combustor used to demonstrate aspects of progressive combustion and equilibration.

FIG. 2 shows a schematic diagram of a preferred embodiment of a combustor 1 which has been used to experimentally validate some features of the progressive combustion aspects of the current invention. The cross-sectional area of combustion regions is preferably increased with streamwise distance. E.g., FIG. 3-FIG. 5 show sections A-A, B-B and C-C respectively of the combustor embodiment of FIG. 2. These components and dimensions are exemplary and not prescriptive of the methods demonstrated.

For example, in the proof of concept embodiment shown, the combustor comprises five concentric steel fire tubes 12-16, each of the four largest tubes having inlets 17-20 for air-steam-fuel mixture. Here, the smallest fire tube 12 is configured as the upstream pilot end of the combustor 1, and the largest tube 16 as the downstream exhaust end of the combustor 1. The inner diameters of the fire tubes preferably increase. E.g. tubes 13-16 are about 1.3 centimeters (0.5 inches), 2.5 centimeters (1 inch), 5.0 centimeters (2 inches), 7.5 centimeters (3 inches), and 10 centimeters (4 inches). Their lengths are approximately 17.5 centimeters (7 inches) for the pilot fire tube 12, 80 centimeters (31 inches) for the exhaust fire tube 16, and about 23 centimeters (9 inches) for the other three fire tubes 13-15. A plenum cap 21 is attached to the downstream end of the four smallest fire tubes. The inner diameter of the cap 21 may be configured equal to the inner diameter of the fire tube 12-15 to which it is attached. The cap's outer diameter preferably fits within the inner diameter of the next largest fire tube 13-16. A fire tube plate 22-25 is attached to the upstream end of each the four largest fire tubes 13-16 with a circular opening in each plate configured to allow the clearance of the next smallest fire tube 12-15. Fluid plenums 26-29 are preferably formed by the space bounded by the wall of a fire tube and its corresponding cap, and the wall of the next largest fire tube and its corresponding plate. Air-steam-fuel mixtures F4 may be fed into each plenum through one or more inlets. E.g., two inlets 17-20 in each plenum. The mixtures may exit the each plenum through orifices 30-38 that deliver the mixture to the combustion regions 39-48 that define the inner chamber of the combustor 1.

While particular orifices have been shown, numerous streamwise delivery locations may be used. Similarly, continuous streamwise delivery slots or porous walls may be used. These delivery methods permit the distribution of delivery locations to be treated as a semi-continuous or a continuous distribution.

At the upstream end of the combustor 1, an air-steam-fuel pilot mixture F5 may be fed to the system first by delivery through the pilot inlets 17 to the pilot plenum 26. From the plenum 26, the uncombusted pilot mixture F5 may be fed to the pilot combustion region 39 through a perforated steel fire tube 12. The wall of the pilot fire tube 12 is perforated with numerous orifices. E.g., about 80 fairly equally spaced orifices 30-31 of diameter about 1.6 millimeters (0.0625 inches). The fluid mixture delivered through 40 of these orifices 30 may impinge on the hot surface of an igniter 49. e.g. a glow plug. The igniter 49, may be powered by an external electric power source 50. It may be inserted into the combustor 1. e.g., through the opening of the 2.5-centimeter fire tube plate 22 and secured there by means of a flange 51.

The fluid mixture delivered by the remaining 40 orifices 31 is preferably delivered to the pilot combustion region 39 downstream of the pilot igniter orifices 30 and the igniter 49. The fluid mixtures delivered by first the 40 orifices 30 are heated as they flow between the igniter 49 and the perforated pilot tube 12. These fluids are preferably heated to temperatures that support their self-ignition. This forms a pilot combustion region 39 just downstream of tip of the igniter 49. Remaining pilot fluid mixture is preferably delivered progressively to the pilot combustion region 39 and mixed with the product fluids formed from the combustion of previously delivered pilot fluids. Mixing elements may be provided. E.g., A steel coil 52 may be wrapped along the inner wall of the pilot fire tube 12. This enhances mixing within the pilot combustion region 39 and has a thermal mass and bluntness that helps act as a flame holder, thus improving the stability of the pilot.

The combustion product outflow F20 of the pilot combustion region 39 is equivalent to the inflow of the stage 1 combustion region 40. An increasing number of orifices are preferably configured along the streamwise increasing direction. E.g., Four orifices 32, about equally spaced at 90 degrees from each other in the same axial plane, permit fluid communication between the stage 1 plenum 27 and the stage 1 combustion region 40. The air-steam-fuel mixture F4 is preferably delivered to the stage 1 combustion region 40 through the four stage 1 orifices 32. The delivered mixture is preferably energized by the inflow F20 to the stage 1 combustion region 40, sufficiently to support the combustion of the uncombusted mixture delivered at this location.

The combustion product outflow F21 of the stage 1 combustion region 40 is equivalent to the inflow of the stage 2 combustion region 41. Similar to Stage 1, about twelve orifices 33-35 allow fluid communication between the stage 2 plenum 28 and the stage 2 combustion region 41. The twelve orifices 33-35 of stage 2 are may be divided into 3 sets of 4 orifices. The four orifices comprising a set are preferably placed in the same axial plane, preferably oriented with about an equal spacing of 90 degrees from each other. Each orifice set may be axially separated by approximately 3.8 centimeters at ambient conditions.

In this configuration, the orifices 33-35 protruded about 6 millimeters into the stage 2 combustion region 41. Generally speaking, the air-steam-fuel mixture F4 delivered to the stage 2 combustion region 41 through the stage 2 orifices 33-35 is energized by the inflow F21 to the stage 2 combustion region 41, supporting its combustion. e.g., uncombusted mixture delivered through the four orifices 33 of the most upstream of the three orifice sets, is energized by the inflow F21 to the stage 2 combustion region 41. This forms the first combustion region 42 of three stage 2 micro-combustion regions 42-44. The subsequent combustion products from the first micro-combustion region 42 are preferably used to energize the uncombusted mixture delivered through the second set of orifices 34. Likewise, the combustion products from the second micro-combustion region 43 of stage 2 are preferably used to energize the uncombusted mixture delivered through the third set of orifices 35. The outflow of the third micro-combustion region 44 is equivalent to the overall combustion product outflow F22 of the stage 2 combustion region 41.

The combustion product outflow F22 of the stage 2 combustion region 41 is equivalent to the inflow of the stage 3 combustion region 45. Similarly with previous stages, eighteen orifices 36-38 allow fluid communication between the stage 3 plenum 36 and the stage 3 combustion region 45. These eighteen orifices of stage 3 may be divided into 3 sets of 6 orifices 36-38. The six orifices comprising a set are placed in the same axial plane, being oriented with about an equal spacing of 60 degrees from each other.

In this configuration, each set of orifices is axially separated by approximately 3.8 centimeters. The orifices 36-38 protrude approximately 6 millimeters into the stage 3 combustion region 45. Generally speaking, the air-steam-fuel mixture delivered to the stage 3 combustion region 45 through the stage 3 orifices 36-38 is energized by the inflow to the stage 3 combustion region 45, supporting its combustion. More specifically, uncombusted mixture delivered through the six orifices 36 of the most upstream of the three orifice sets, is typically energized by the inflow to the stage 3 combustion region 45, forming the first 46 region of three stage 3 micro-combustion regions 46-48. The subsequently combustion products from the first micro-combustion region 46 are preferably used to energize the uncombusted mixture delivered through the second set of orifices 37. Likewise, the combustion products from the second micro-combustion region 47 of stage 3 are preferably used to energize the uncombusted mixture delivered through the third set of orifices 38. The outflow of the third micro-combustion region 48 is equivalent to the overall combustion product outflow F23 of the stage 3 combustion region 45.

The combustion product outflow F23 of the stage 3 combustion region 45 is equivalent to the inflow of the burnout and equilibration region 4. The 4-inch diameter fire tube 23 surrounding the burnout and equilibration region 4 is preferably insulated. E.g., it is wrapped with approximately 1.5 inches of ceramic fiber insulation 53 to minimize undesired heat losses from the burnout and equilibration region 4. The outflow of the burnout and equilibration region 4 is equivalent to the exhaust of the combustor 1.

Figure 6:
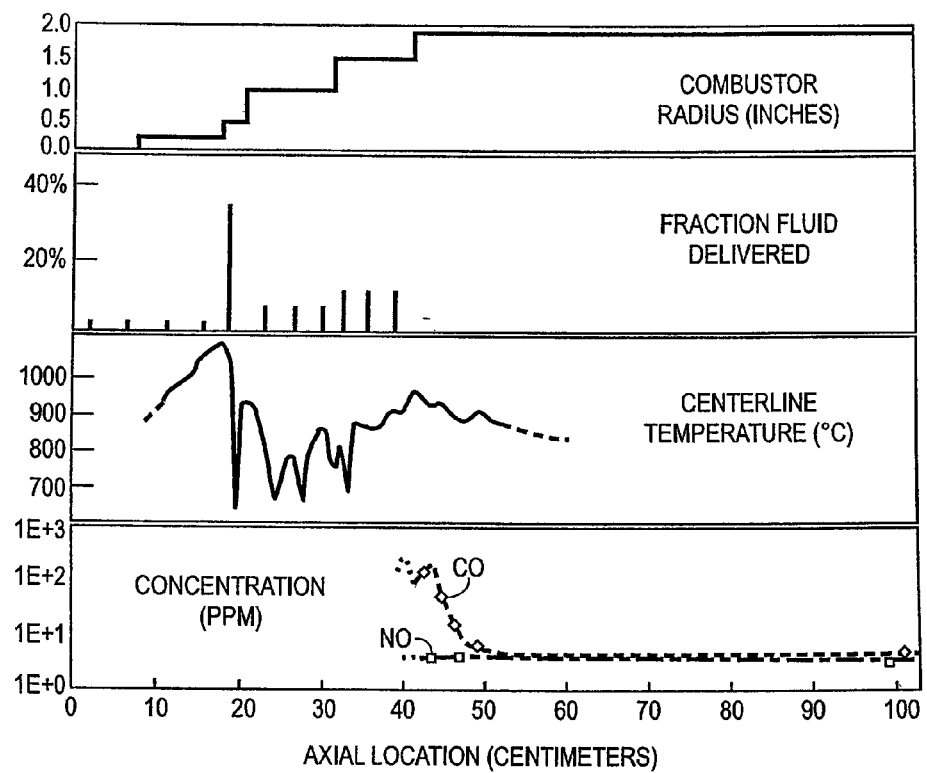
FIG. 6 shows graphical results of centerline temperature, CO concentration, and NO concentration for experiments performed in the exemplary embodiment of FIG. 2-FIG. 5.

FIG. 6 shows a representative centerline temperature profile measured from experiments performed with the proof of concept combustor embodiment of FIG. 2-FIG. 5. TABLE 1 shows input conditions for the results shown in FIG. 6.

TABLE 1

| Fuel | Propane - $C_3H_8$ |
|---|---|
| Temperature of Delivery to Pilot | 125° C. |
| Temperature of Delivery to Stage 1 | 127° C. |
| Temperature of Delivery to Stage 2 | 136° C. |
| Temperature of Delivery to Stage 3 | 128° C. |
| Relative Stoichiometric Ratio of Pilot - Lambda-p | 1.22 |
| Relative Stoichiometric Ratio of Stage 1 - Lambda--1 | 1.22 |
| Relative Stoichiometric Ratio of Stage 2 - Lambda-2 | 1.22 |
| Relative Stoichiometric Ratio of Stage 3 - Lambda-3 | 1.22 |
| Water to Fuel Ratio of Pilot - W-p | 1.0 |
| Water to Fuel Ratio of Stage 1 - W-1 | 7.1 |
| Water to Fuel Ratio of Stage 2 - W-2 | 7.1 |
| Water to Fuel Ratio of Stage 3 - W-3 | 7.1 |
| Ignitor Power | 150 W |
| Fraction of Total Volumetric Flow to Pilot | 11% |
| Fraction of Total Volumetric Flow to Stage 1 | 34% |
| Fraction of Total Volumetric Flow to Stage 2 | 22% |
| Fraction of Total Volumetric Flow to Stage 3 | 33% |
| Overall Water to Fuel Ratio - W-tot | 6.3 |
| Overall Relative Stoichiometric Ratio - Lambda-tot | 1.22 |
| Total Flowrate | 150 slpm |

With further reference to FIG. 6, after the pilot region, the average temperature during the progressive combustion sequence ranges from about 650° C. to 950° C., with an average of about 800° C. Each minimum in the temperature profile is located approximately 1 to 2 centimeters downstream of the corresponding delivery location. The minima in the profile are due to convective energy transfer from the energetic combustor fluids to the recently delivered premix fluids. Temperatures of the magnitude shown in FIG. 6 are significantly lower than the temperatures that are conventionally believed to be necessary to achieve stable combustion. Furthermore, such low temperatures are expected to result in low NOx formation.

FIG. 6 also shows the NOx and CO concentrations in the burnout and equilibration regions of the combustor with the relative stoichiometric ratio of the pilot, Lambda-p, set to 3.5. These results demonstrate the ability to achieve CO and NOx concentrations of about 3 ppm or less for both species. Low NOx levels are generally expected for such low temperatures. However, CO levels are commonly expected to be very high under low temperature combustion conditions. Just downstream of the last delivery location at about 43 centimeters, CO levels are initially very high, on the order of 100 ppmv to 1000 ppmv due to the incomplete burnout of recently delivered fuel. As one progresses downstream however, CO levels fall significantly with an eventual asymptote of about 3.5 ppm. The results of this experiment demonstrate that very low CO levels can be achieved with the implementation of the progressive combustion method.

Figure 7:
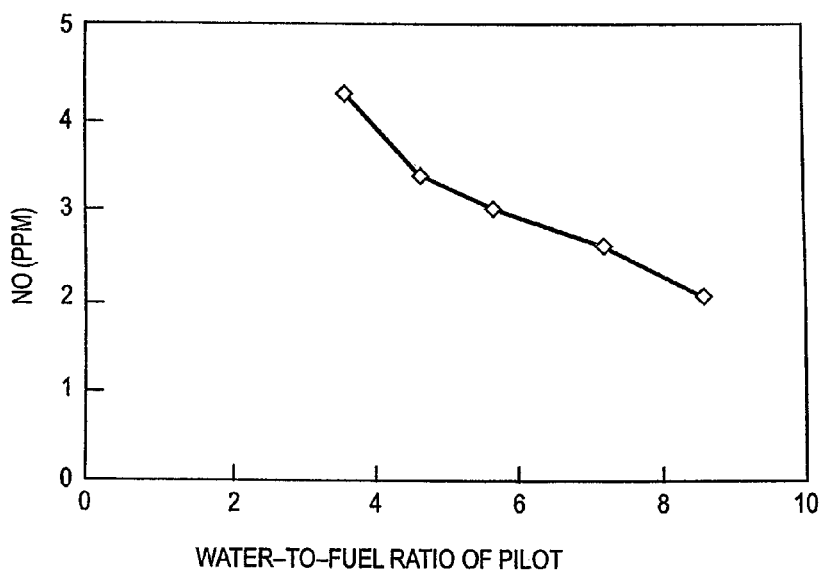
FIG. 7 graphically shows the impact of the water-to-fuel ratio of the pilot on NO concentration in the exhaust fluids of the exemplary embodiment FIG. 2-FIG. 5.

FIG. 7 shows the dependency of exhaust NOx levels to the water-to-fuel ratio of the pilot, while keeping the inputs to the remainder of the system constant. As more water is added to the pilot the concentration of NOx in the exhaust (downstream of the progressive combustion sequences) decreases. This is generally expected as more water results in a lower flame temperature in the pilot, resulting in lower rates of thermal NOx formation. FIG. 7 also demonstrates for these conditions, most of the NOx in the system is likely formed in the pilot where temperatures are highest, suggesting that the progressive combustion sequence as demonstrated here, results in sub-ppm levels of NOx due to the low temperature achievable during the combustion process. Consequently, sub-ppm levels of NOx may be achievable for the overall combustor provided that it is configured with a pilot that has low NOx levels.

Figure 8:
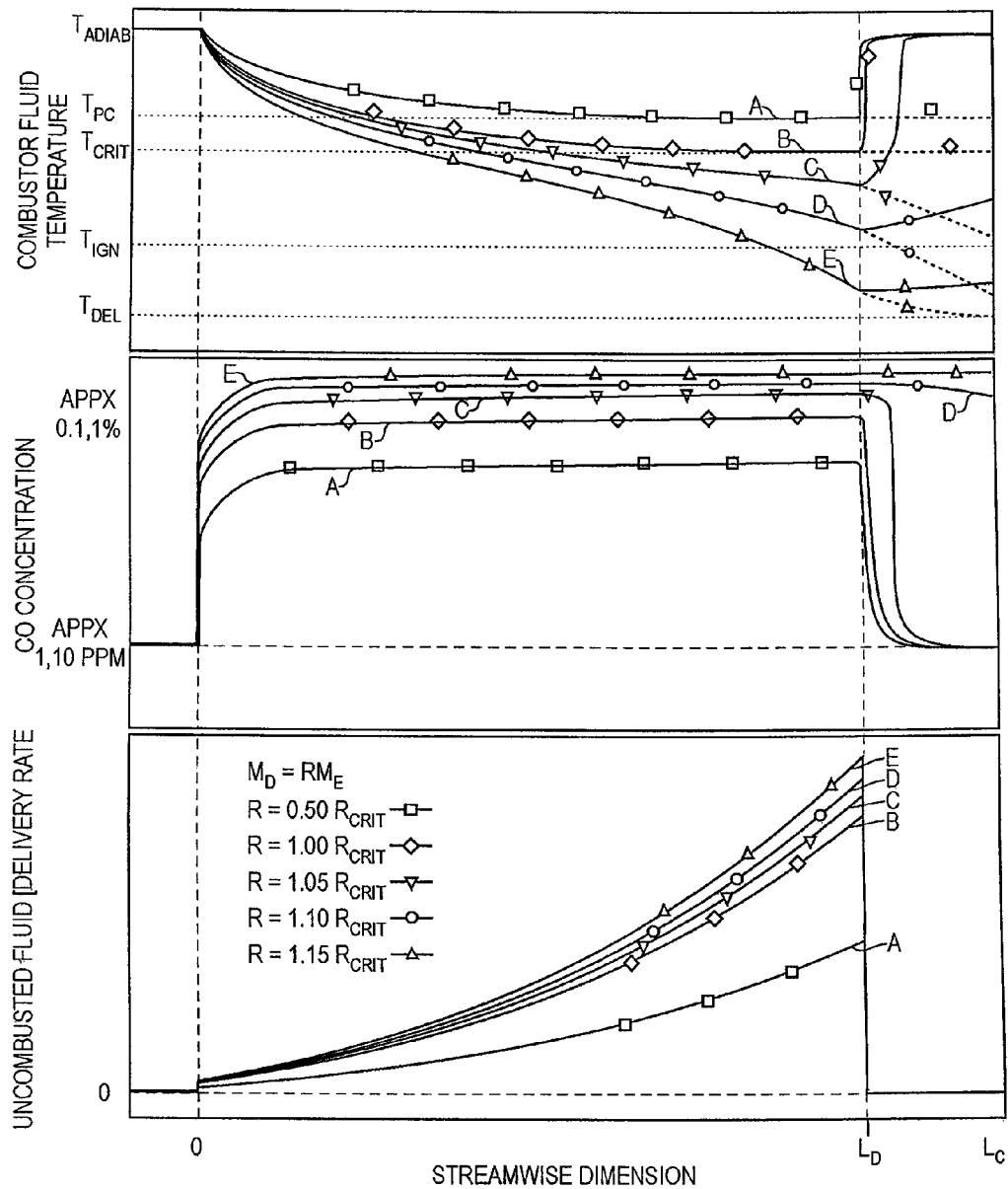
FIG. 8 schematically illustrates the impact of various delivery rate profiles on progressive combustion stability, indicating stable, conditionally stable, and blowout regimes

FIG. 8 depicts an embodiment of the current invention configured and controlled with progressive delivering and combusting of an uncombusted fuel-oxidant-diluent mixture at five different mixture delivery rates. It shows the combustor fluid temperature, the CO concentration, and relative fluid delivery rate versus progressive combustion along the streamwise distance. This shows preferable configurations with two inherently stable combustion delivery rates (A and B), and two other possible conditionally stable delivery rates (C and D), compared with an unstable delivery rate (E).

For the five cases shown, uncombusted fluid is delivered over a length $L_D$ into a combustor of length $L_C$. The uncombusted fluid is delivered at a mass flow rate $M_D$ per unit length of the combustor. Energetic combustor fluid flows into a region at a mass flow rate $M_E$. The uncombusted fluid and energetic fluid mix to form a mixed combustion fluid within the region. Some fuel and oxidant combust in a region, heating the mixed fluid, forming energetic fluid and delivering it into the next region.

The fluid delivery along the streamwise dimension of the combustor from the upstream end to $L_D$, the delivery flow ratio R of $M_D$ to $M_E$ is preferably configured and controlled to be approximately constant in these configurations. Consequently, these cases are characterized by approximately exponentially increasing delivery flow rates $M_D$ and mass flow rates $M_E$. Five different ratios R of mass delivery flow ratio of $M_D$ to $M_E$ are shown, with consequent differences in the total quantity of fluid delivered, which is proportional to the area under each delivery profile curve.

In each of these five cases, the chemical compositions of the delivered uncombusted fluid mixture are modeled as about the same, resulting in about the same adiabatic combustion temperature $T_{ADIAB}$. (i.e., the final fluid temperature after the uncombusted fluid is caused to be fully combusted with no heat loss). In these configurations, the hot or energetic pilot fluid is preferably delivered into upstream end of the progressive combustion region. In these models, the hot pilot fluid is assumed to have about the same composition and to be at the adiabatic combustion temperature $T_{ADIAB}$ that would result from adiabatically combusting the delivered uncombusted fluids. The temperatures of the delivered uncombusted fluids $T_{DEL}$, are preferably lower than the self-ignition temperature $T_{IGN}$ of the combusting fluids.

The neutrally stable configuration B is preferably configured for and controlled at about the critical fluid delivery flow ratio $R_{CRIT}$, which by definition separates the inherently stable delivery condition, such as configuration A, from the conditionally stable condition, as in configuration cases C and D (in contrast to the unstable configuration E). This critical flow rate ratio $R_{CRIT}$ of Case B is the maximum progressive flow rate ratio possible which can be maintained indefinitely in a given configuration. Under such conditions, maintaining the flow rate ratio $R_{CRIT}$ results in an approximately exponentially increasing fluid delivery profile. This can be nominally maintained over an unlimited length of the reactor (beyond $L_D$) without quenching combustion at a mean temperature of the mixed combusting fluid at or greater than $T_{CRIT}$.

For configurations with hot fluid entering the combustion region at a temperature greater than $T_{CRIT}$, progressively delivering uncombusted fluid at the flow ratio $R_{CRIT}$ will maintain the mean mixed combusting fluid temperature greater than or equal to $T_{CRIT}$ (declining asymptotically towards $T_{CRIT}$ in successive combustion regions). For hot combustion fluid delivered into one of the combustion regions at $T_{CRIT}$, delivering uncombusted fluid into that and later regions at the critical fluid delivery ratio $R_{CRIT}$ will maintain the mean mixed fluid temperature at $T_{CRIT}$ in that and successive combustion regions.

Preferably delivering uncombusted fluid in configuration B at the critical fluid delivery ratio $R_{CRIT}$ under adiabatic combustion provides the highest sustainable delivery ratio $R_{CRIT-Max}$ to sustain mixed combusting fluid temperature $T_{CRIT}$ when hot fluid is delivered into the combustion regions at $T_{CRIT}$. With increasing heat loss to the surroundings, the uncombusted fluid is preferably delivered at a critical flow delivery ratio $R_{CRIT}$ that is progressively lower than $R_{CRIT-MAX}$ and which declines in proportion to the heat loss rate.

Some embodiments may be preferably configured and controlled to progressively deliver uncombusted fluid at a flow ratio $R_{PC}$ less than the critical flow rate ratio $R_{CRIT}$ giving an inherently stable configuration depicted as case A. For such inherently stable configurations A, the combustion fluid temperature is typically greater than and approaching a mean temperature of sustained progressive combustion, $T_{PC}$, which is greater than the equivalent mixed fluid temperature for the critical case $T_{CRIT}$ at the critical flow rate ratio $R_{CRIT}$. With preferable configurations like A, if the hot fluid enters a combustion region at $T_{PC}$, then delivering uncombusted fluid at the ratio $R_{PC}$ above $R_{CRIT}$ will maintain the fluid temperature at $T_{PC}$.

To preferably maintain the combustion fluid at a mixed fluid temperature $T_{PC}$ above the mean fluid critical temperature $T_{CRIT}$, at least the rate of diluted fuel-oxidant mixture is preferably controlled to maintain the fluid deliver ratio $R_{PC}$ less than the corresponding critical delivery flow rate ratio $R_{CRIT}$ of delivered fluid mass flow rate to hot combustor fluid flow rate.

For inherently stable configurations A or the neutrally stable configuration B, the hot combustion fluid temperature exiting one or more combustion regions is preferably controlled to be at least greater than or equal to $T_{CRIT}$ by configuring and controlling the uncombusted fluid deliver rate ratio at a level that is less than or equal to $R_{CRIT}$. In such preferable inherently or neutrally stable configurations, combustion provides specific molar heat release rates (by combustion of the combustible gases per minimum stoichiometry of material) that deliver heat at about equal to the rate of enthalpy change due to formation of the products of combustion relative to the uncombusted fluid, plus the rates of enthalpy absorbed by any diluents (including diluents within the fuel and oxidant mixture, any diluent fluids added, and any oxidant fluids or fuel fluid in excess of the stoichiometric ratio) plus any rates of net heat loss (or minus any heat gain) from the surrounding walls, regions, and upstream and downstream combustion regions.

These models assume continuous delivery, or pseudocontinuous delivery through numerous orifices, with corresponding rapid mixing. Real combustor may have more discrete flows and slower mixing rates. Accordingly, configurations are preferably configured to control flow delivery ratios in a range from a lower ratio to an upper ratio. This results in the combusting fluid temperature being controlled between a lower and an upper mixed fluid temperature.

For example, fluid delivery ratio is preferably controlled between $R_{PC}$ and ratio $R_{CRIT}$ to preferably control the mean combusting fluid temperature in an inherently stable sustainable fashion between $T_{PC}$ and $T_{CRIT}$. Since the allowable flow delivery ratio is zero at $T_{ADIAB}$, the flow delivery ratio $R_{PC}$ is preferably controlled to less than 90% of the range between $T_{CRIT}$ and $T_{ADIAB}$. For higher inherently sustainable flows, the ratio $R_{PC}$ is preferably controlled between 33% and 99% of $R_{CRIT}$ and more preferably between 67% and 95% of $R_{CRIT}$.

In some configurations, the fluid delivery may be configured for conditionally stable operation by providing an uncombusted delivery flow delivery ratio $R_{CS}$ greater than the critical flow delivery ratio $R_{CRIT}$. Such higher flow delivery rates $R_{CS}$ result in conditionally stable combustion as exhibited in cases C and D or in eventually unstable combustion as shown in configuration E of FIG. 8. Progressively delivering fluid at the fluid delivery ratio $R_{CS}$ results in an exponentially increasing fluid delivery profile that would eventually quench the combustion process. Mixing cooler delivered uncombusted fluids with the combusting fluid at such delivery ratios $R_{CS}$ cools the combustion toward the temperature of the delivered uncombusted fluids, $T_{DEL}$. This eventually drops the combusting fluid temperature below the ignition temperature $T_{IGN}$ as depicted in FIG. 8 case E.

With further reference to FIG. 8, in configurations with conditionally stable delivery rates $R_{CS}$ above $R_{CRIT}$ has reduced the fluid temperature below $T_{CRIT}$ the uncombusted fluid delivery is preferably stopped or more preferably reduced to below $R_{CRIT}$ while the mixture of uncombusted and combusting fluid is still above its self-ignition temperature. E.g., to $R_{PC}$. This allows the combustion process to be rejuvenated to a higher temperature, preferably above $T_{CRIT}$. Configurations are preferably configured and controlled to at least avoid letting the temperature of progressive combustion fall below the self-ignition temperature $T_{IGN}$. (i.e., the blowout condition shown in case E). In such a blowout condition, there is little or no possibility of the combustion process being rejuvenated after the end of uncombusted fluids delivery. Such blowout conditions are preferably avoided to sustain stable combustion in the present invention.

When the progressive delivery of uncombusted fluid is stopped in conditionally stable configurations such as C and D, the temperature of the hot combusting fluid system will rise toward the adiabatic combustion temperature, $T_{ADIAB}$. When the progressive delivery is reduced from $R_{CC}$ to a fluid ratio $R_{PC}$, the combustion fluid temperature will rise back towards $T_{PC}$. As desired, combusting fluid temperatures generally below $T_{CRIT}$ may conditionally maintained by alternating fluid delivery rates between levels above and below $R_{CRIT}$. This is preferably combined by weighting the relative duration of the higher and lower flow rates. E.g., the time at $R_{CC}$ relative to time at $R_{PC}$.

With further reference to the conditionally stable cases C and D of FIG. 8, when the combustion process are rejuvenated, a configuration may provide for the end of the combustor to occur before full fuel conversion is approached. In such cases D, CO concentrations remain relatively high. E.g., above about 100 ppmv. In other configurations, the combustor is preferably extended to provide further residence time and burnout of unburned hydrocarbons and CO, as shown in configuration C. e.g., with CO below about 10 ppmv. This distinguishes between conditionally stable combustion with burnout as in case C, versus a conditionally stable configuration without burnout as in case D.

Figure 13:
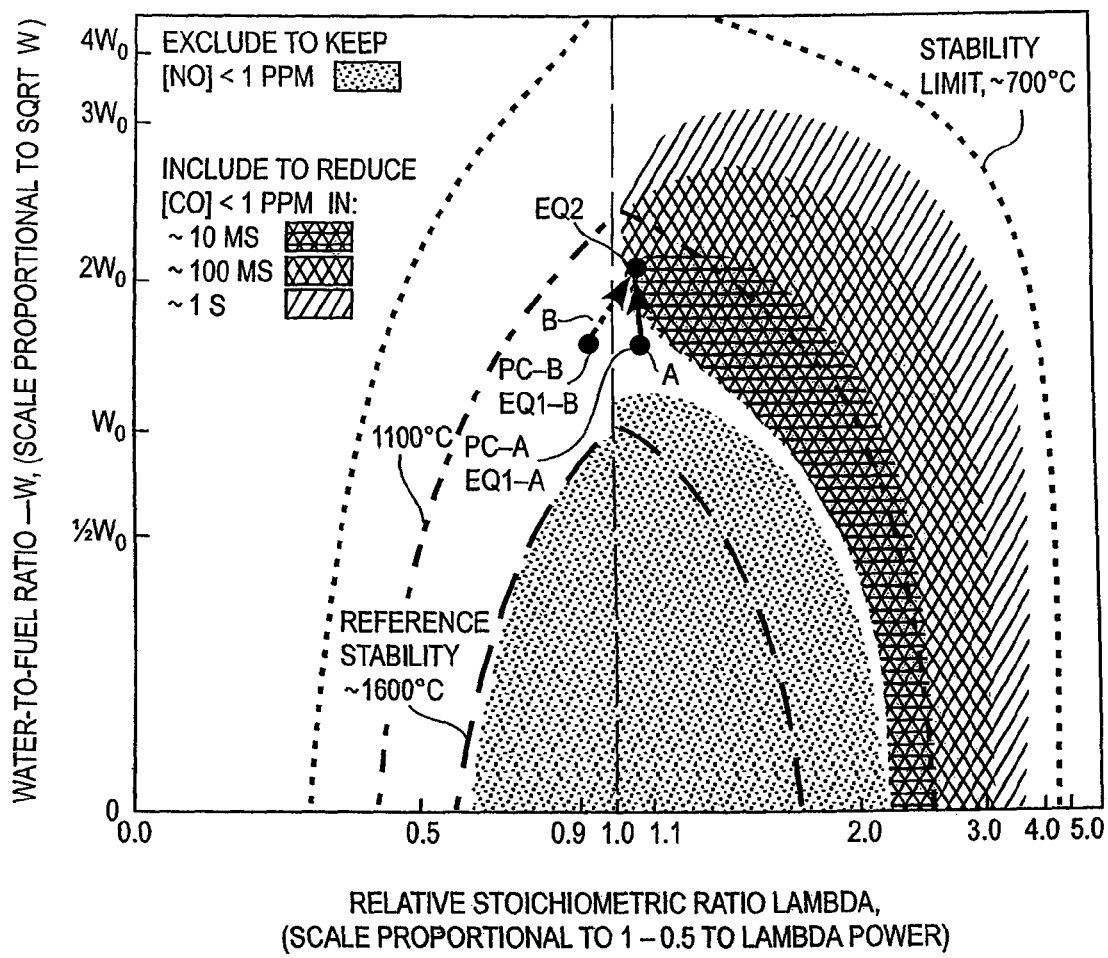
FIG. 13 is a generalized Campbell diagram indicating regimes of flame stability, NOx formation and CO removal based on the relative proportions of oxidant, fuel and diluent comprising the fluid mixture input to a typical hydrocarbon combustion system.

In some configurations, one or more of the delivery flow ratio or composition of fluid delivered into a region may be desirably controlled to adjust the adiabatic temperature of the mixed composition in one or more regions. For example, the adiabatic temperature may be constrained to limit formation of combustion byproducts such as NOx, as depicted in FIG. 13 by staying outside of the lower central region.

Figure 15:
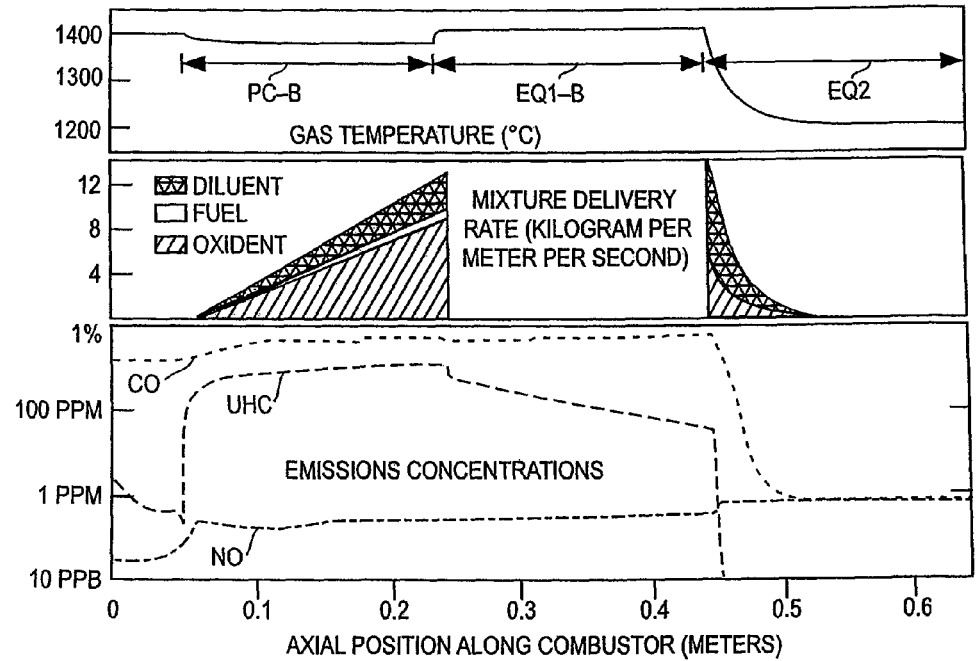
FIG. 15 is a graph of the results of a 1-dimensional simulation of a progressive combustion and equilibration strategy in which progressive combustion is caused to occur under slightly rich conditions, followed by the delivery of additional diluent and oxidant to the equilibration regions of the system.

Similarly, the delivery flow ratio or fluid delivery composition may be controlled to adjust the mixed fluid composition within one or more regions. For example, configurations may be desirably configured for rich combustion or partial oxidation as shown in FIG. 15. In such systems, the oxidant/fuel ratio is configured to below the stoichiometric ratio. This oxidant/fuel ratio Lambda is preferably configured above the coke or soot formation level. E.g., Lambda >0.5 or 0.6. More preferably, both the water/fuel and air/fuel ratios are adjusted to constrain soot formation below a desired level.

With further reference to conditionally stable cases C, D (or the unstable case E), while unlimited exponentially increasing delivery would eventually quench the combustion process, in some configurations the delivery profile may be configured with multiple delivery regions interrupted by periods of lower delivery ratios less than $R_{CRIT}$, or no delivery. During the periods of lower or no delivery ratios, the combustion process is allowed time to rejuvenate, thus keeping the system within a pseudo stable state. This is analogous to discrete staged Progressive Combustion, in that delivering a finite amount of fluid at each delivery location is nominally similar to having a relatively high fluid delivery ratio. However, when the amount added at each location is constrained and has a finite rate of mixing with the combusting fluid, this is like interrupting delivery or spreading out the fluid delivery preventing the combusting fluid temperature from being reduced to quenching conditions.

To control the temperature within a range that is bounded by a lower temperature below $T_{CRIT}$ (and above $T_{IGN}$) the flow rate is preferably controlled in a time weighted combination of delivery flow ratios both above and below $R_{CRIT}$. E.g. between a range from 25% to 150% of $R_{CRIT}$. The delivery flow ratio of uncombusted fluid to hot combustion fluid may similarly be controlled such that the progressive streamwise integral from an upstream region inlet to a downstream region is at least greater than the delivery flow ratio required to maintain ignition. Preferably the delivery flow ratio is maintained to provide a temperature about 33% of the way between the ignition temperature $T_{ING}$ and the adiabatic combustion temperature $T_{ADIAB}$.

Preferably this streamwise integral of the delivery flow ratio is controlled within a range about the corresponding progressive streamwise integral for the respective critical flow delivery ratios in the combustion regions. Controlling the flow delivery ratio may similarly be used to control the fluid temperature within a temperature range about the critical temperature $T_{CRIT}$. Where fluid delivery composition varies in the streamwise direction, this integral will further account for such variations and the corresponding changes in the ignition temperature, adiabatic temperature, and critical temperature, and corresponding critical delivery flow ratio. More preferably, this streamwise integral of the delivery flow ratio is maintained at less than or equal to the streamwise integral of the critical delivery flow ratio sequentially within each region. This maintains inherently stable combustion.

To increase combustion stability of a Progressive Combustion system for the same amount of fluid delivered, some configurations preferably reduce the rate of delivery and distribute it over a longer length of the combustor both with continuous or staged-discrete delivery. This method of delivering fuel, oxidant and diluent fluids is complemented by controlling for other methods. For example, these additional concerns preferably include one or more of (1) the degree of combustion stability, (2) controlling pollutant removal such as CO, (3) controlling pollutant formation such as NOx, (4)

controlling the adiabatic temperature of the diluted mixture, and (5) the overall constraint on the physical size of system.

Figure 9:
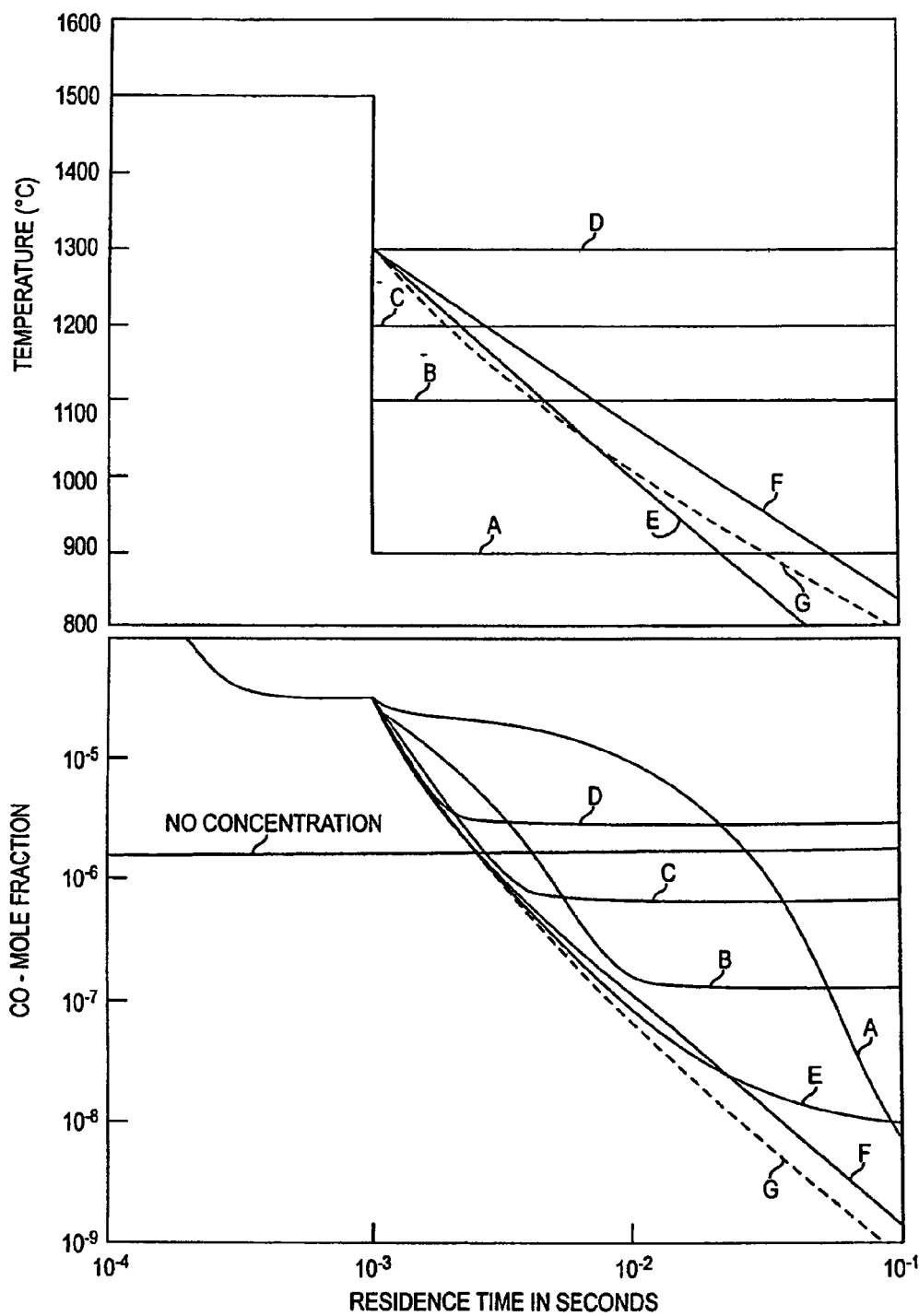
FIG. 9 depicts the time-based effects of equilibration temperature on CO and NO concentration in the product gases from the combustion of a typical hydrocarbon fuel with 5% of excess air and 3.15 times more water than the fuel mass.

FIG. 9 graphically depicts the results of some time-based numerical equilibration regimes. These simulations show the effects of a range of equilibration region temperature control methods on the concentrations of CO and Nitric Oxide (NO) in the combustion product fluid after the primary combustion region. NO is shown as representative of all the oxides of nitrogen (NOx). These results are numerical computations utilizing the comprehensive iso-octane oxidation mechanism published by Curran et al. (2002).

The combustible fluid modeled comprises iso-octane as fuel fluid, and air as the oxidant fluid provided in about a 5% excess of stoichiometric flows. Water is preferably used as diluent fluid. E.g., being set at about 3.15 times the fuel mass. Primary combustion is modeled as occurring at about 30 atm. At the end of the combustion period, the combustion product fluids are at 1500° C.

About 1 ms after the final quantities of uncombusted fluid is delivered to the combustor, the combusting fluid reaches a nominally post-combustion state at the beginning of the equilibration region. Here the CO concentration is about 28 ppm and the NO concentration is about 1.6 ppm.

To demonstrate the impact of some embodiments of controlling equilibration conditions, a variety of temperature controls are implemented after 1 ms for an equilibration period, while maintaining the pressure at about 30 atm. For these models, temperature controls may nominally be implemented by isobarically transferring energy to or from the system.

In configurations A, B, C and D, the equilibrating fluid temperature is nominally changed or stepped very rapidly from 1500° C. to about 900° C., 1100° C., 1200° C. and 1300° C., each step being followed by an equilibration residence time in an equilibration region in which the temperature is held about constant. By comparison, in configurations E and F, the equilibration temperature first steps very rapidly to 1300° C. followed by a more gradual decrease in the equilibration temperature. The temperature profiles in the cases E and F are shown as about log-linear with temperature declining linearly versus log-time.

With further reference to the lower graph in FIG. 9, the corresponding CO concentration responses are shown for these configurations. For the temperature step-isothermal configurations A, B, C and D, the CO removal rate immediately after the step is highest in case D with the hottest isotherm at 1300° C., and lowest in case A with the coldest isotherm at 900° C. Intermediate configurations B and C have intermediate rates.

Configurations A, B, C and D, show that while higher temperatures initially favor higher CO removal rates, higher temperatures also result in higher CO equilibrium levels. This is due to greater dissociation of carbon dioxide at higher temperatures. For example it may take over 20 ms for CO concentrations to be reduced to approximately 3 ppmv at 900° C., while it may only take about 1 ms at 1300° C. However, after about 100 ms at 1300° C., the CO concentration remains its equilibrium value of about 3 ppmv. By contrast, for the 900° C. case, the CO concentration after 100 ms may drop over 100 times to about 8 ppbv while approaching its equilibrium level of near 3 ppbv.

Changes in NO concentration for several different temperature controls are also shown in FIG. 9. For the cases shown, the NO concentration of about 1.5 ppm that was established further upstream during the primary combustion process at 1500° C., was not significantly changed during any of the subsequent equilibration temperature controls methods.

With continued reference to FIG. 9, cases E and F demonstrate other equilibration temperature profiles (apart from step-isotherm sequences) that result in faster responses in CO concentration reduction to target levels. The factor of improvement in response time generally increases with lower final temperatures or lower target CO levels. For example, for a CO target level of about 1 ppm a gradually decreasing temperature profile of condition E results in the realization of the target CO concentration in about 85% of the time it would take for the best step-isothermal option.

For a target CO of about 0.2 ppmv, case E is able to reduce the time to approximately 75% of the best step-isothermal option. In keeping with this trend, for 10 ppbv, case F reduces the response time to about 40% of the best step-isothermal option. The slower temperature gradient case F initially drops the CO rate slower than the faster gradient case E. However to achieve lower CO emissions lower than 10 ppbv, there comes a time when the slower gradient F reduces CO emissions faster than case E.

The desired emissions levels may be adjusted according to pertinent regulations. E.g. 50 ppmvd, 25 ppmvd, 9 ppmvd, or 2.7 ppmvd, converted to a 15% $O_2$ basis. More preferably, the emissions with power systems are preferably configured to an output based parameter. E.g. NOx mass emissions per shaft power out: <500 mg/GJ for <3 MWe; <240 mg/GJ, and for 3 MWe to 20 MWe and <120 mg/GJ for >20 MWe. For more stringent emissions, these levels could be reduced to about 0.032 kg/MWhe.

In comparing the benefits of temperature steps and the greater benefits of temperature gradients, more preferred embodiments may be configured with a continuous curvilinear variation in the temperature gradient. "For a given fluid composition, there may be a preferred fluid temperature which gives a more rapid rate of decline in CO concentrations. i.e., a higher temperature would result in slower rate of CO reduction due to higher carbon dioxide dissociation, while a lower temperature would give a slower rate of CO oxidation reaction. In considering a streamwise sequence of fluid compositions, there may be a preferred local fluid temperature gradient which gives a preferred CO oxidation rate for the locally changing fluid composition."

Accordingly, a hypothesized embodiment may be configured for an optimum temperature profile, which continuously optimizes the local temperature gradient. This lowers the temperature with increasing residence time, thus optimizing the CO oxidation rate. Such a method may result in a compact embodiment, reducing CO more rapidly to target levels. This hypothesized embodiment is schematically estimated and shown as configuration G in FIG. 9.

This time-dimensional perfectly mixed analysis may readily be extended to two and three dimensional models to provide more realistic spatial and temporal distributions. The configuration method is preferably adjusted to accommodate the increased times required for real combustion, turbulence, mixing and evaporation rates. These improved results may be used to refine the equilibration methods described above e.g., of using sequential or progressive equilibration regions with stepped, ramped or continuously varying temperatures, temperature ranges, or temperature profiles optionally coupled with one or more equilibration volumes and residence times.

Figure 10:
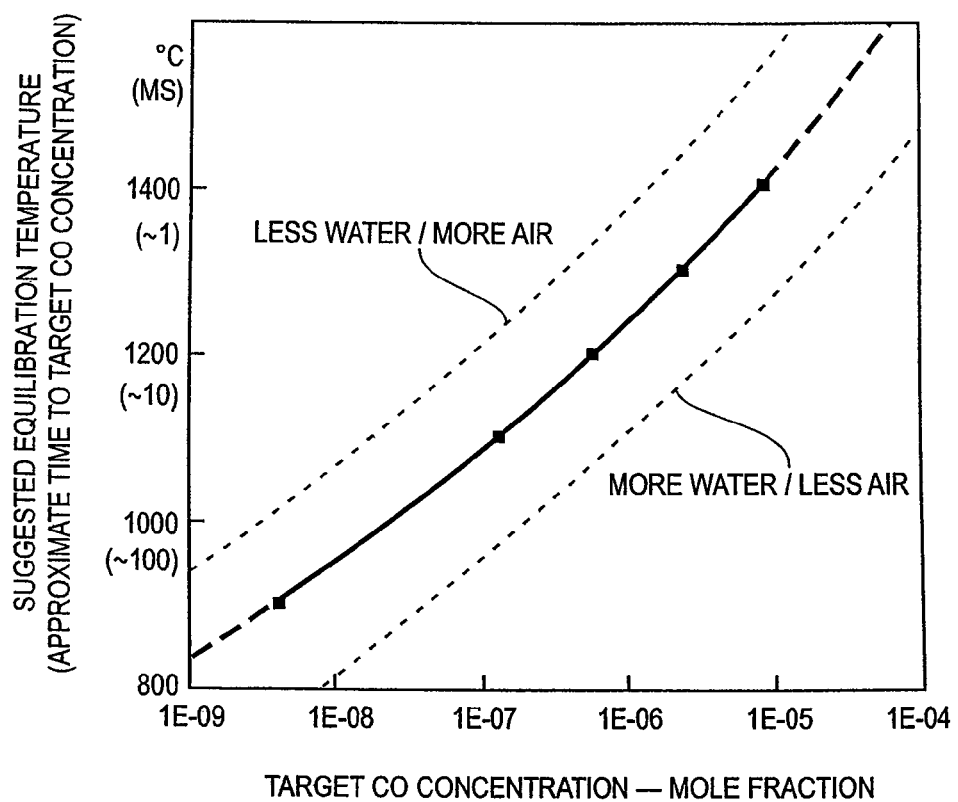
FIG. 10 shows suggested equilibration temperatures at the expected equilibration times for quickly reducing the concentration of CO in combustion product gases to target levels.

With reference to FIG. 10, some configurations may control one or both of the temperature and residence times of the equilibration regions while accounting for the water to oxygen ratio in the energetic combustor fluid. FIG. 10 schematically approximates control methods showing desired CO concentration versus the suggested equilibration temperature for the water-diluent system as modeled in FIG. 9. Similar control methods, approximately graphically parallel to the relationships of FIG. 10, may be applied for different combustion systems comprising carbon-based fuels, and various oxidant and diluent fluids. As demonstrated in less-water/more-air and more-water/less-air cases, if excess air displaces water as the primary diluent, the suggested equilibration temperature is higher for a given target CO concentration and vice versa.

For the configuration modeled in FIG. 10, the combustion product fluids may be brought to near the equilibration temperatures corresponding to the target CO levels indicated in the figure. This may use one or more of the equilibration configuration methods described above to approach the desired temperature profile. With further reference to FIG. 10, similar relationships between the best equilibration temperature and the desired emissions concentration at a given residence time may be obtained for mixed fluid diluents comprising air and water or similar fluids with other fluids comprising one or more of nitrogen, water, carbon dioxide and/or oxygen. Generally speaking, as water or steam displaces excess air as a primary diluent, target CO levels may be achieved at lower temperatures.

Figure 12:
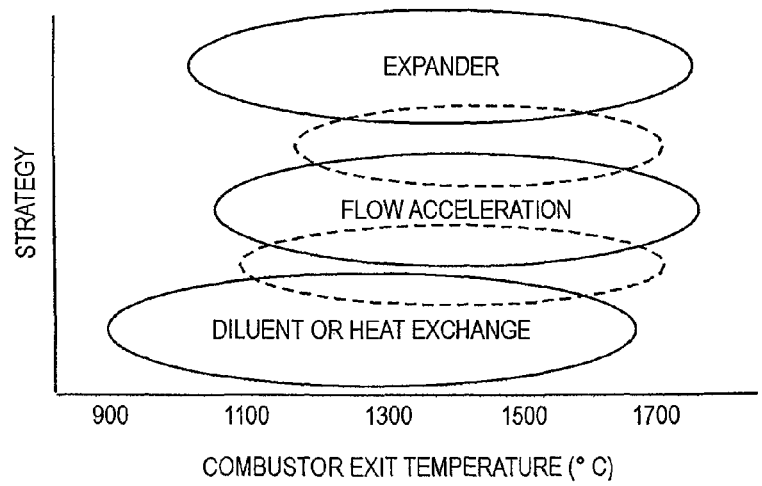
FIG. 12 is a graph of the appropriateness of suggested embodiments based on the design temperature of selected components comprising the combustion system.

One or more of 1) diluent addition, 2) heat exchange, 3) flow acceleration, and/or 4) expansion or work extraction may be used in controlling the temperature of the equilibrating fluid within one or more equilibration regions. For example, FIG. 12 conceptually depicts a variety of sets of embodiments for temperature control in equilibration regions, using one. These control methods are conceptually depicted as covering temperature regions such as 900° C., 1100° C., 1300° C., 1500° C. and 1700° C., within the range of turbine inlet temperatures that characterize current and future levels of turbine technologies.

Figure 11:
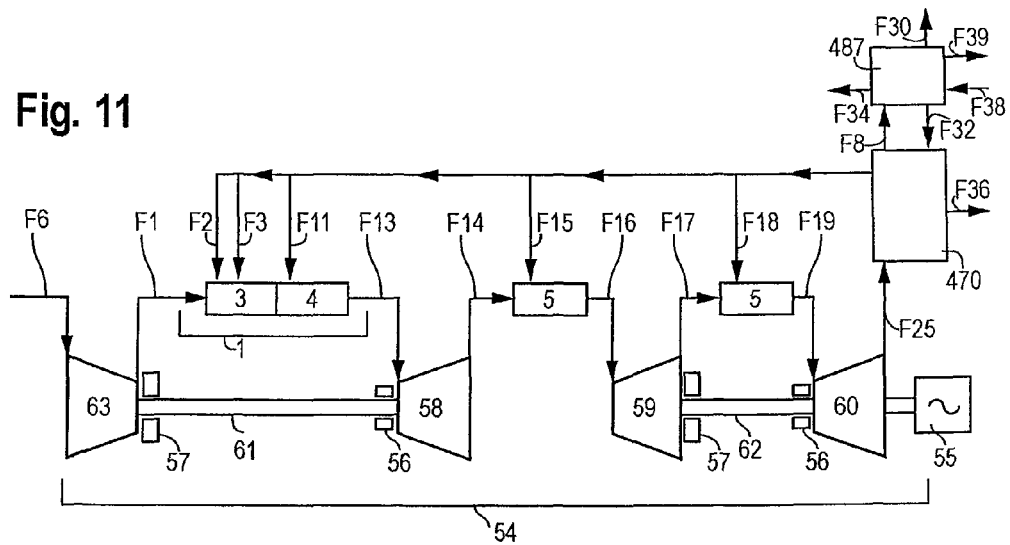
FIG. 11 schematically depicts an embodiment of the energetic sections of a gas-turbine system comprising equilibration regions and using turbine expanders for temperature control.

Each of these temperature control methods may be utilized individually or in any combination with any of the others, at any of these or other temperature ranges. The diluent addition and/or heat exchange methods are nominally shown as being variously applicable to the full temperature range. While it may be used at lower temperatures, the expander method, FIG. 11, is shown as being capable of handling higher turbine inlet temperatures such with energetic fluids in advanced turbines at about 1700° C. At such temperatures, the equilibrium CO concentrations are substantially higher than the desired system exit concentrations.

Accordingly the temperature reductions and efficiencies desired preferably involve utilizing expanders with one or more equilibration regions after the first and/or subsequent expander(s) where temperatures are appropriate for the equilibration and residence time desired to achieve the desired reductions in CO emissions. Where multiple turbine stages are used to reduce the energetic fluid temperature from the turbine inlet temperature (TIT) to the desired lowest equilibration temperature (e.g. from 1500° C. to 1200° C.), then multiple equilibration regions are preferably used over a single step equilibration region. These can be configured for faster equilibration and thus shorter and more compact equipment than a single step. Downstream equilibration regions are preferably longer than the intake residence times.

FIG. 11 shows a representative embodiment of a gas turbine power generating system utilizing the Progressive Combustion and Equilibration strategies to control emissions. This uses a combustor 1 comprising a (contiguous) primary combustion region 3 and an optional equilibration region 4 as described in FIG. 1. This embodiment may use one or more interstage equilibration regions 5 within the turbine to further reduce CO concentrations at the lower temperatures resulting from partial expansion of the combustion gases.

Progressive combustion as described in conjunction with FIG. 1 occurs in the 'primary combustion region' 3 a portion of the combustor 1. The source for the oxidant fluid F1 may be a blower, a compressor or a compressor system 63. For example, uncompressed air F6 may be modified, humidified, enriched with oxygen, or diluted, prior to, during, or after compression. This may include wet compression with a water mist entrained into the compressor inlet, or delivered within the compressor. Exhaust gas may also be recirculated and compressed along with atmospheric air F6. As discussed in FIG. 1, other inputs to the primary combustion region 3 include one or more fuel fluids F2 and one or more diluent fluids F3.

Combustion product fluids from the primary combustion region 3 may pass through one or more optional equilibration regions 4-5, where CO concentrations are reduced by controlling one or more of the fluid temperature, and/or residence time (as discussed above). Further oxidant F1 or diluent F3 may be added at this point as part of the temperature control, and to refine stoichiometry to provide a beneficial oxidant concentration in the equilibration region.

Figure 16:
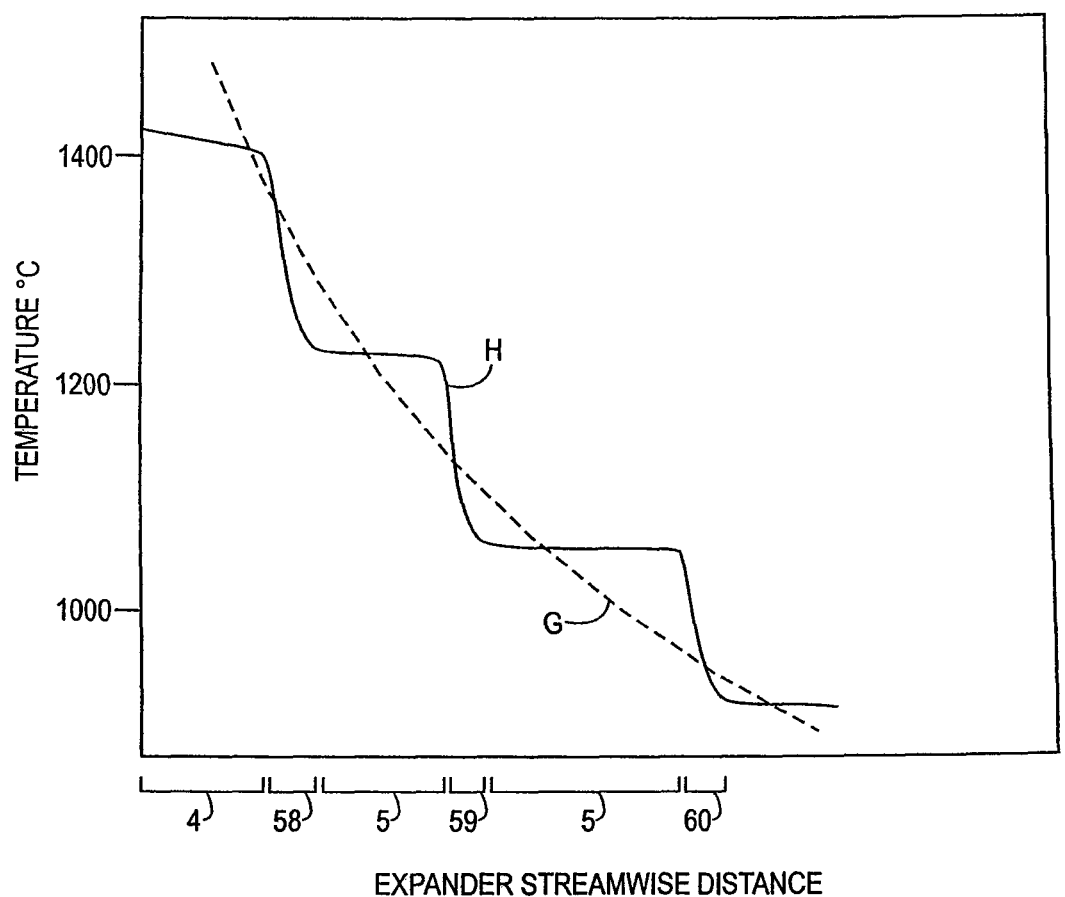
FIG. 16 schematically depicts a curvilinear temperature profile through a plurality of expanders with intermediate equilibrating residence regions compared with a desired profile.

With reference to FIG. 16, in some embodiments, fluid temperatures at an intermediate region in the power system would result in equilibrium CO concentrations above a desired CO outlet concentration. E.g., at the outlet of a high pressure combustor feeding hot combustor fluid into the inlet of a turbine. The fluid temperatures would preferably be reduced along a curvilinear temperature path to provide rapid CO reduction. E.g., a hypothetical path G such as described above and shown in FIG. 9, and in FIG. 16.

As schematically depicted in FIG. 16, expansion through an expansion stage of a work engine is relatively rapid. This configuration nominally shows hot fluid flowing from an equilibrating region 4 into a turbine inlet with a temperature of about 1400° C. The hot fluid temperature can be approximated by a step drop in temperature, or preferably as a rapid curvilinear temperature gradient or profile. E.g., stages 58, 59, 60 in a turbine or reciprocating engine. Where available expansion equipment expands the fluid faster than the desired curvilinear temperature path, the temperature may be reduced along a more rapid a curvilinear path with one or more expanders to one or more desired holding temperatures. E.g. as shown by path H in FIG. 16 or as in paths C, or D, in FIG. 9. At least one of the expansion stages 58, 59, 60 is preferably followed by at least one equilibrating region 5. The volume of the equilibrating region is preferably configured relative to the fluid flow rate to provide an equilibrating residence time to further oxidize the CO to $CO_2$.

For example, with reference to FIG. 11, in some configurations, the pressurized, partially equilibrated combustion gas F13 is expanded through a first turbine expander 58, producing partially expanded combustion gases F14. As is typical in a gas turbine, the first turbine 58 may be used, via a shaft 61 or other energy transfer means, to drive one or more compressors 63, and possibly a load such as electric generator 55. Some configurations may configure equilibration regions between turbomachinery stages configured along a common shaft. The mechanical shaft power or electrical power produced is preferably used for mechanical drive applications or energizing a user load or to convert electricity to at least one of mechanical power, light, adding heat, or removing heat. This method further uses the power system to preferably transmit the electricity generated over distances exceeding about 8 km or 5 miles.

Implementing the progressive combustion and equilibration strategies herein described, may, in some configurations, require a larger than conventional combustor 1 to provide a greater residence time. Such larger residence times may be required with high diluent concentrations where the oxidant concentration is preferably reduced to near stoichiometric concentrations (for example from about 15% excess oxygen to about 5% excess oxygen).

The larger compressor combustor 1 may involve a greater separation between compressor 63 and first turbine expander 58. In such a configuration, one or more additional bearings 56 may be required to control shaft vibrations. A larger thrust bearing or additional thrust bearings 57 may also be required to accommodate a thrust differential due to the use of significant quantities of diluent F3 in the combustor 1 with correspondingly lower oxidant fluid F1, compared with conventional lean combustion turbines.

Where an equilibration region 5 is configured between two turbine expansion stages one or more shaft stabilization bearings 56 may be added to control vibrations of a long shaft 23. e.g., between one or both of expander stages 58 and 59, and between expander stages 59 and 60. These bearings may be mounted on stators between expansion stages. Such bearings 56 are preferably protected from the hot fluid and cooled with diluent to enable operation near the high temperature flows. The heated diluent is preferably recycled into the progressive combustion system.

As a result of the work extracted in the first turbine expander or expander stage 58 the partially expanded combustion gas F14 will be cooler than the partially equilibrated combustion gases F13 produced by the combustor 1. The resulting cooler more equilibrated combustion gases F16 are then preferably expanded through a second turbine expander stage 59. These cooler gases may be passed through a second interstage equilibration region 5 within a turbine section for at least a second desired interstage residence time. This takes advantage of these lower temperatures to further reduce the CO concentrations towards the new lower equilibrium CO concentrations at this lower temperature. The second interstage residence time may be larger than the first interstage residence time to accommodate the slower CO reaction rate at the cooler temperature, depending on the degree of reaction desired relative to the temperature. In such equilibration regions, at least 75% of the temperature reduction occurs in less than 50% of the streamwise fluid path length of that equilibration region.

With reference to FIG. 9, uses an equilibration residence time of at least 0.5 ms is desired for the reaction at about 1500° C. Considering configuration D, an expansion with temperature drop from 1500° to 1300° C. may use an equilibration residence time of at least 0.7 ms, and preferably at least 1 ms. Similarly, configurations C, E, F and G may use a residence time of at least 1.5 ms, and preferably 3 ms to reduce the CO to below 1 ppmv. These models are for near stoichiometric combustion. E.g., about 1.05 Lambda. E.g. the NOx output is preferably controlled to less than about 2.7 ppmvd at 15% $O_2$ for combustion system or to 0.032 kg/MWh in a power system.

This interstage equilibration region 5 may also include a fluid control device 10, including the addition of further diluent F15 such as pressurized steam from a Heat Recovery Steam Generator (not shown). This second turbine expander stage 59 may variously be coupled via a power shaft 62 to one or more load devices such as a generator or another compressor (not shown). One or more additional turbine expander stages 59 as well as other equilibration stages 5 and fluid control devices 11 may be included further downstream before combustion gases are fully expanded. Some of the remaining thermal energy in the fully expanded combustion gases F25 may be recovered by producing steam such as with a Heat Recovery Steam Generator (HRSG) (not shown) and/or hot water with an economizer heat exchanger, for use as one or more of the diluent, oxidant or fuel fluids in this system F1, F2, F3, F11, F15, and for use as a diluent F3 or as modifier of the oxidant fluid F1 or the fuel fluid F1.

Again with reference to FIG. 12, the flow acceleration methods of temperature control are nominally shown to cover moderate to high temperatures where they are most effective. (They could also be used at lower temperatures.) As noted, the flow acceleration and expander methods can be used together as well as with diluent cooling and/or heat exchange methods. Such a heat exchanger preferably provides at least 10% of the temperature reduction provided in the equilibration regions. Such heat exchangers preferably use diluent to remove the heat. The heated diluent is then preferably delivered upstream into the progressive combustion or equilibration regions. It may be delivered downstream into an equilibration region.

The internal volume of each of these equilibration regions may further be individually configured to adjust the residence time undergone by the equilibrating fluid within each of those equilibration region. E.g., the cross sectional area and flow length. Existing residence time between one or more expansion stages is preferably accounted for when configuring the additional volume desired for the residence time desired. For example, in many turbines, an aerodynamic member is commonly provided to redirect the expanded flow to one or both of a preferred direction and a preferred velocity. The residence time of the fluid passing through such stators or vanes is preferably accounted for and subtracted from the desired residence time when configuring the additional residence volume.

The residence time provided after cooling with the expander is preferably at least 50% of the residence time of the fluid expanding through the expander stage. In some configurations, the residence time is preferably at least 175% of the turbine transit time. This preferably includes and is greater than the flow time through any stator or vane.

The temperature and/or residence times in the individual equilibration regions may further be configured in various combinations to achieve the desired concentrations of one or more species within the energetic or working fluid discharged from the energy-conversion system. Similar systems may be configured to control one or more intermediate products or by-products in the reaction fluids of other reactive systems.

Expansion through an expansion stage of a work engine, such as a turbine 58 or reciprocating engine, is relatively rapid and can be approximated by a step drop in temperature or rapid temperature gradient, or preferably as a rapid curvilinear temperature profile. Distributed diluent mist delivery, mixing and evaporation, steam delivery or fluid acceleration may similarly provide relatively rapid temperature reduction. Conductive heat transfer may be used for more gradual temperature reduction. These methods may be combined to provide multiple cooling and equilibration methods.

FIG. 13 schematically shows the implications of various mixtures of air, a typical hydrocarbon fuel, and water/steam on a combustion process. For illustrative purposes and in accordance with the state-of-the-art catalytic emissions reduction, desired emissions levels for NOx and CO are assumed to be at or below 1 ppmv. (Note the concentrations shown are at the nominal outlet concentration. To compare with other applications, these concentrations would need to be converted such as to a dry ppmvd 15% $O_2$ basis or mg/GJ output or lb/MWhe output. A 1 ppmv NOx emission near 1.05 relative air/fuel ratio Lambda compares to about 3 ppmv converted to a 15% $O_2$ basis.) The temperature of the Progressive Combustion region is schematically shown as correlating to the stability of the system, since higher temperatures maintain higher reactivities in the combusting gas.

The diagram nominally identifies a reference water-to-fuel ratio, $W_0$, which corresponds to the water-to-fuel ratio preferable to give a flame temperature of approximately 1600° C. For different unburned mixtures, this value of $W_0$ varies, being generally higher as the temperature of unburned fluid mixture is higher, and as the energy density of the fuel is higher. A $W_0$ coinciding with a flame temperature of 1600° C. is depicted here as a reference state, 1600° C. being an approximately the hottest mean temperatures likely to be produced in the combustor of conventional metal-based gas turbines. Hotter temperatures may be used with ceramics.

With continued reference to FIG. 13, the highest flame temperature typically coincides with lower quantities of diluent. In the system of FIG. 13, this diluent may be in the form of water/steam, excess air, or excess fuel. Consequently, the flame temperature isotherms increase in temperature as they approach the zero-water (W=0), stoichiometric (Lambda=1) condition.

NOx formation in combustion systems is generally promoted by higher temperatures (typically above about 1400° C.) and the presence of oxygen and nitrogen. Accordingly, in FIG. 13, the conditions for significant NOx formation is generally for lower diluent levels which support higher temperatures, while being generally skewed to lean conditions where more substantial quantities of molecular oxygen and nitrogen from excess air are present.

Generally speaking, greater than stoichiometric amounts of oxygen support the oxidation of CO to $CO_2$ such that CO concentration may approach ppm levels. Consequently lean conditions (i.e. Lambda >1) are preferable for reducing CO concentrations to or below ppm levels. The equilibrium concentration of CO increases above 1 ppm as system temperatures increase above about 1200° C. to 1400° C. In FIG. 13, this boundary is schematically shown as the upper-temperature boundary of the CO removal region. Since lower temperatures support lower equilibrium concentrations of CO, the lower-temperature boundary of the CO removal region is defined by condition wherein temperatures are too low to support high-enough kinetic rates to the lower CO equilibrium concentration levels. With continued reference to FIG. 13, if more time is allowed for equilibration at lower temperatures, the lower-temperature boundary of the CO removal region shifts to lower temperatures. About a ten-fold increase in available residence time typically results in about a 100° C. increase in the minimum temperature typically provided to reduce CO concentrations to about 2 ppm levels or less. Possible equilibration operating regimes to control CO concentrations are shown for possible residence times of 10 ms, 100 ms, and one second.

FIG. 13 shows that numerous fluid composition paths may be used to control emissions to desired levels while satisfying stability constraints. For example, a system configured only for high-stability may have high NOx. The method of performing progressive combustion followed by equilibration is a suggested way of addressing these multiple demands. By passing the combusting/combusted fluids through a sequence of conditions during a single combustion process, more than one emission target may be met.

As an example, FIG. 13 shows two example sequences of methods demonstrating this strategy. In case A, slightly lean wet progressive combustion may be followed by final water to achieve CO equilibration conditions. (e.g., 1.0<Lambda<1.1)

Here, Progressive Combustion may first be performed at 1400° C., as shown at location "PC-A". After all of the fuel and air, with some water, is added in this Progressive Combustion region, the resulting combusted gas is maintained at this condition for a first equilibration period. This preferably provides a high degree of removal of UHCs and "above-equilibrium" CO levels. This equilibration period is identified as "EQ1-A".

While a temperature of about 1400° C. is below temperatures of high NOx production, it is outside the conditions desired to provide very low CO levels. Consequently, the hot fluid is preferably cooled with more residence time to reduce the CO. e.g., more water may be added, establishing a new gas temperature of about 1200° C. Providing sufficient residence time may bring the gas to a condition that reduces CO concentrations to below about 1 ppm, "EQ2". According to the established criteria, the gas is best held at condition "EQ2" for a CO reduction dwell time of about 10 ms or more. If the product gases are to be employed at a lower temperature (for example in a turbine system where the TIT less than about 1200° C.), more water might then be added after the second equilibration period "EQ2". The gas may be expanded through a turbine.

Figure 14:
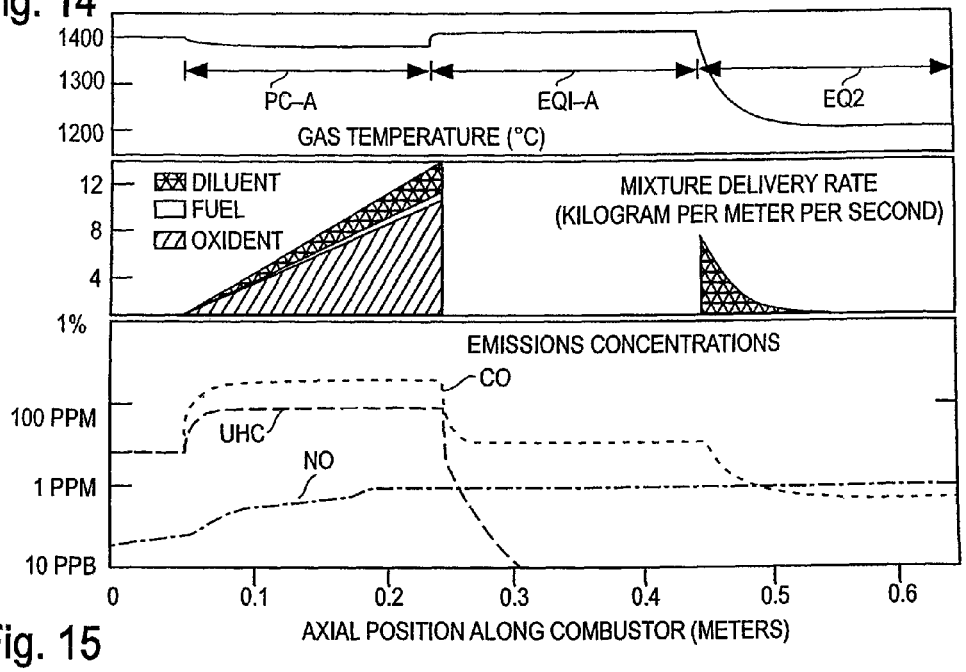
FIG. 14 is a graph of the results of a 1-dimensional simulation of a progressive combustion and equilibration strategy in which progressive combustion is caused to occur under slightly lean conditions, followed by the delivery of additional diluent to the equilibration regions of the system.

FIG. 14 shows the results of a numerical simulation of an example of this strategy. Fluid delivery during progressive combustion is here modeled as linear and distributed or as pseudo discrete using numerous orifices. During the period of progressive combustion, "PC-A", the temperature of the combusting mixture is maintained below about 1400° C. due to the continual presence of incompletely combusted fuel, maintained by the constant delivery of uncombusted mixture. For similar reasons, CO and UHC levels may have high concentrations. E.g., on the order of 100 ppmv. After progressive combustion, further residence time is preferably provided for burnout and gas equilibration. e.g., Equilibration or burnout region "EQ1-A", wherein rates of CO and UHC removal are initially very high. UHC concentrations are preferably decreased through several orders of magnitude within the burnout region. E.g., to sub-ppb levels. CO concentration also drops and approaches equilibrium after a very short time in the burnout region. E.g., it may equilibrate to about 10 ppmv after about 1 ms.

In configurations such as depicted in FIG. 13, and FIG. 14, water and/or steam diluent is preferably delivered into the hot fluid downstream of primary combustion using one or more of the technologies incorporated by reference. E.g., water or steam are preferably delivered through one or more perforated tubes positioned transversely to the fluid flow. This diluent delivery is preferably configured and/or controlled to provide desired transverse temperature profiles in the hot combustion fluid exiting the combustor. Alternatively orifices or nozzles in combustor walls may be used as exemplified in the patents to Ginter.

With continued reference to FIG. 13, "PC-B" identifies a preferred case in which Progressive Combustion is allowed to occur under slightly rich conditions (0.9<Lambda<1.0). This is preferably followed by an equilibration or burnout region "EQ2-B." More oxidant and diluent are preferably delivered to establish the second equilibration conditions "EQ2". These are preferably delivered through nozzles or orifices about perforated tubes or walls as described by the technology incorporated by reference. The amount of oxidant delivered is preferably sufficient to change the oxidant/fuel ratio by at least 2%. This preferably pushes the stoichiometry from the rich region with insufficient oxidant to combust all the fuel, to the region region with an excess of oxidant.

Simulation results of such a preferred rich to lean configuration are shown in FIG. 15. The low availability of oxygen under the rich conditions results in less NOx being formed compared to progressive combustion under slightly lean conditions. High concentrations of UHC are present in the first equilibration burnout region "EQ1". However these are light molecules, typically methyl species, which are quickly oxidized in the second equilibration region "EQ2". This exemplary rich to lean method results in about 20% to 40% less NOx than the case for progressive combustion under slightly-lean conditions for the conditions chosen.

Many similar reaction paths incorporating such Progressive Combustion and Equilibration methods may be applied in different configurations as best suits the goals of the designer.

Progressive Reactions and Equilibration

Various embodiments of the progressive combustion and equilibration methods described may be beneficially used to conduct a variety of chemical and biochemical reactions, especially exothermic reactions. Configurations similar to the embodiments described above may be used with a reactant fluid comprising a reactant instead of fuel fluid. Similarly, a co-reactant fluid comprising a co-reactant may be used instead of the oxidant fluid. A diluent fluid comprising one or more compounds suitable to dilute the exothermic reaction while not interfering with the desired reaction or causing excessive byproducts is preferably used. These may include hydrocarbons or other non-aqueous chemicals for non-aqueous reaction systems. The thermo-spatial equilibration methods including work extraction described to progressively reduce CO emissions may similarly be used to progress the primary reaction between reactants and reduce intermediate reaction products. The thermo-spatial methods used to constrain byproduct formation, such as NOx, may similarly be used to constrain undesired reaction byproducts.

Such methods preferably control the streamwise rate of diluted reactable fluid delivery to desirably constrain streamwise composition and temperature within desirable ranges to maintain stable reaction rates, progress the reaction to reduce intermediate products, and constrain residual byproducts. These thermo-spatial configuration and control methods improve product quality and value. They improve the rate at which reactants can be processed, and provide more compact components. The work extraction methods exemplified may be used to further recover energy and reduce processing costs.

The reactions are preferably conducted to reduce intermediate products to a concentration less than or equal to 100 ppmv. The temperature of the hot fluid is preferably constrained to below 1700° C. at the exit of one of the reaction regions or to similar temperatures. E.g., at the inlet to an expander. Temperatures within reaction regions may also be preferably controlled to similar temperatures.

Hot fluid is preferably delivered to the inlet of the reactor to initiate the reaction and bring it to a desired reaction temperature according to the respective chemical process. E.g., the fluids may be heated to a temperature where the reaction is at least 200% greater than that with reacting fluids at ambient conditions.

For example, such progressive reactions and chemical equilibration may include, but are not limited to: alkylations, carbonylations, carbamylations, chlorination, direct oxidations, ethoxylations, halogenations, hydroformylations, hydrogenations, nitrations, solution polymerizations, sulfations, and sulfonations. Such diluted progressive reactions may be used to prepare a wide variety of chemicals, biochemicals and foods. These may include, but are not limited to: a surfactant, a demulsifying agent, an emulsifying agent, a hydrocarbon fuel, a synthetic lubricant, a halogenated hydrocarbon, a hydrocarbon solvent, an organic polymer, a fire retardant, a fabric treatment agent, an antibiotic, an antiviral agent, an anti-pathogenic agent, a fungicide, a herbicide, an insecticide, a pesticide, a rodenticide, a food product, and the like.

Various embodiments may be used to prepare the following chemicals: ethanol from ethylene, ethylene oxide by oxidation of ethylene, ethylene amines from ethylene oxide, ethylene glycol by oxygenating ethylene, ethanol amines from ethylene dichloride, hydrogen peroxide using anthraquinone; maleic anhydride, n-butanephenol from propylene and benzene, adipic acid from phenol, caprolactam from cyclohexane, cyclohexanol from benzene, ethylene glycol ethyl ethers, chloroacetic acid from acetic acid, propylene oxide, n-Butanol from propylene, acrylic acid from propylene, tetrahydrofuran from maleic acid, and n-Butyl acrylate by esterfying acrylic acid. The emulsifying agents or surfactants may include: alkyl benzene sulfonates, linear alkylbenezene sulfonates, secondary alkane sulfonates, ester sulfonates, alpha olefin sulfonates, alkyl glyceryl ether sulfonates, alkyl glyceryl sulfonates, methyl ester sulfonates, natural fat sulfonates, natural oil sulfonates, alcohol sulfates, alcohol ether sulfates and the like.

Other embodiments preferably utilize the methods described herein and in the technology incorporated by reference to controllably mix fluids and conduct endothermic reactions. These may include delivering heated diluents to add heat to the system, increase the reactants' temperature and promote the reaction.

Generalization

From the foregoing description, it will be appreciated that a novel approach for mixing, delivering and reacting three or more fluids to controlling emissions or components from intermediate or byproduct reactions has been disclosed using one or more methods described herein. This method of controlling emissions may be applied to a broad range of combustion systems such as including gas-turbines, internal combustion engines, furnaces, burners, process heaters, incinerators, flares, and subterranean combustors.

The flows and/or composition of the associated fuel, oxidant and diluent fluids may be varied to achieve a desired chemical composition or composition range of the working or energetic fluid, to control or reduce intermediate and/or byproduct emissions. The kinetic and thermodynamic principles herein applied to controlling UHC, CO & NOx emissions can, by extension, be applied to the control of other chemical species present in the energetic or working fluid of a combustion system, chemical refining process, or other chemical reaction or processing system.

While the components, techniques and aspects of the invention have been described with a certain degree of particularity, it is manifest that many changes may be made in the specific designs, constructions and methodology herein above described without departing from the spirit and scope of this disclosure.

Where dimensions are given they are generally for illustrative purpose and are not prescriptive. Of course, as the skilled artisan will appreciate, other suitable sizes, orientations, configurations and distributions of fluid delivery orifices, fluid passages, and other components may be efficaciously utilized, as needed or desired, giving due consideration to the goals of achieving one or more of the benefits and advantages as taught or suggested herein.

Where combustor, mixing chambers and orifice delivery configurations are provided, similar two or three dimensional configurations or combinations of those configurations may be efficaciously utilized, including varying the nominal thicknesses, diameters, cross sectional shapes, spacings, orientations, and other dimensions and parameters for the combustor walls, mixing chambers and orifices. Additional equilibration regions may be added or configured in the combustion or reaction system to control intermediate or byproduct species as desired or needed. E.g., by controlling one or more of the carbon, oxygen, hydrogen, and nitrogen compositions. Where fluid delivery refers to gases, it will be appreciated that the fluids may comprise liquid sprays or mists.

Where the terms fuel, reactant, diluent, water, carbon dioxide, air, oxygen, oxidant, and co-reactant have been used, the methods are generally applicable to other combinations of those fluids or to other combinations of other reacting and diluent fluids. Concentrations of other elements such as sulfur, phosphorus, halogens, noble gases, and selected metals or ceramics may also be controlled.

Where fluid quantities are referred to, these methods are generally applicable to include quantities delivered at multiple times, and to continuous fluid flows. Where assembly methods are described, various alternative assembly methods may be efficaciously utilized to achieve configurations to achieve the benefits and advantages of one or more of the embodiments as taught or suggested herein.

Where transverse, axial, radial, circumferential or other directions are referred to, it will be appreciated that any general coordinate system using curvilinear coordinates may be utilized including Cartesian, cylindrical, spherical or other specialized system such as an annular system. Similarly when one or more transverse or axial distributions or profiles are referred to, it will be appreciated that the configurations and methods similarly apply to spatial control in one or more curvilinear directions as desired or prescribed.

While the components, techniques and aspects of the invention have been described with a certain degree of particularity, it is manifest that many changes may be made in the specific designs, constructions and methodology herein above described without departing from the spirit and scope of this disclosure.

Various modifications and applications of the invention may occur to those who are skilled in the art, without departing from the true spirit or scope of the invention. It should be understood that the invention is not limited to the embodiments set forth herein for purposes of exemplification, but includes the full range of equivalency to which each element is entitled.

| COMPONENT LIST | | |
| --- | --- | --- |
| 1 | Combustor | |
| 2 | Combustion Chamber | |
| 3 | Primary Combustion Region | |
| 4 | 1st Equilibration Region or Burnout Region | |
| 5 | 2nd Equilibration/Interstage Region | |
| 6 | Premixing Region | |
| 7 | Common Premixing Region | |
| 8 | Premix-Combustion Walls | |
| 9 | Premix-Premix Walls | |
| 10 | 1st Equilibration Fluid Control Device | |
| 11 | 2nd Equilibration Fluid Control Device | |
| 12 | Perforated Pilot Fire Tube | |
| 13 | 1" Fire Tube | |
| 14 | 2" Fire Tube | |
| 15 | 3" Fire Tube | |
| 16 | 4" Fire Tube | |
| 17 | Pilot Mixture Inlet | |
| 18 | Stage 1 Mixture Inlet | |
| 19 | Stage 2 Mixture Inlet | |
| 20 | Stage 3 Mixture Inlet | |
| 21 | Plenum Cap | |
| 22 | 1" Fire Tube Plate | |
| 23 | 2" Fire Tube Plate | |
| 24 | 3" Fire Tube Plate | |
| 25 | 4" Fire Tube Plate | |
| 26 | Pilot Plenum | |
| 27 | Stage 1 Plenum | |
| 28 | Stage 2 Plenum | |
| 29 | Stage 3 Plenum | |
| 30 | Pilot Igniter Orifices | |
| 31 | Pilot Combustion region Orifices | |
| 32 | Stage 1 Orifices | |
| 33 | Stage 2 Orifices - Set 1 | |
| 34 | Stage 2 Orifices - Set 2 | |
| 35 | Stage 2 Orifices - Set 3 | |
| 36 | Stage 3 Orifice - Set 1 | |
| 37 | Stage 3 Orifice - Set 2 | |
| 38 | Stage 3 Orifice - Set 3 | |
| 39 | Pilot Combustion region | |
| 40 | Stage 1 Combustion region | |
| 41 | Stage 2 Combustion region | |
| 42 | Stage 2 - Set 1 Micro Region | |
| 43 | Stage 2 - Set 2 Micro Region | |
| 44 | Stage 2 - Set 3 Micro Region | |
| 45 | Stage 3 Combustion region | |
| 46 | Stage 3 - Set 1 Micro Region | |
| 47 | Stage 3 - Set 2 Micro Region | |
| 48 | Stage 3 - Set 3 Micro Region | |
| 49 | Igniter (Glow Plug) | |
| 50 | Electric Power Source | |
| 51 | Igniter Flange | |
| 52 | Thermal Mass Flame Holder | |
| 53 | Insulation | |
| 54 | Turbine Power System | |
| 55 | Electric Generator | |
| 56 | Thrust Bearings | |
| 57 | Additional Bearings | |
| 58 | Turbine1 | |
| 59 | Turbine2 | |
| 60 | Turbine3 | |
| 61 | Shaft1 | |
| 62 | Shaft2 | |
| 63 | Compressor | |
| F1 | Oxidant Inflow to Combustor | |
| F2 | Fuel Inflow to Combustor | |
| F3 | Diluent Inflow to Combustor | |
| F4 | Uncombusted Inflow to Combustor | |
| F5 | Uncombusted Inflow to Pilot | |
| F6 | Uncompressed Oxidant/Air | |
| F7 | Premix Fluids | |
| F8 | Pilot Fluids | |
| F9 | Combustor Fluid Flow | |
| F10 | Energized Combustible Fluids | |
| F11 | 1st Equilibration Delivery Fluids | |
| F12 | Combustor Product Fluids before 1st equilibration | |
| F13 | Combustor Product Fluids after 1st equilibration | |
| F14 | Combustor Product Fluids before 2nd equilibration | |
| F15 | 2nd Equilibration Delivery Fluids | |
| F16 | Combustor Product Fluids after 2nd equilibration | |
| F17 | Combustor Product Fluids before 3rd equilibration | |
| F18 | 3rd Equilibration Delivery Fluids | |
| F19 | Combustor Product Fluids after 3rd equilibration | |
| F20 | Pilot to Stage 1 Flow | |
| F21 | Stage 1 to Stage 2 Flow | |
| F22 | Stage 2 to Stage 3 Flow | |
| F23 | Stage 3 to Burnout Flow | |

COMPONENT LIST

| | |
|---|---|
| F24 | Burnout to Exhaust Flow |
| F25 | Fully Expanded Gases |

What is claimed is:

1. A method of reducing pollutants within a hot reaction fluid formed by reacting reactant fluid comprising a reactant with oxidant fluid comprising an oxidant, diluted by diluent fluid comprising a diluent, within a reaction system having an upstream primary reaction region and a downstream equilibration system having a first equilibration region; the method comprising:
   generating hot reaction fluid within the primary reaction region;
   equilibrating the hot reaction fluid within the equilibration system for a residence time greater than a prescribed residence time; and
   reducing the temperature of the hot reaction fluid within the equilibration system to less than a prescribed temperature at the system outlet;
   wherein configuring the fluid composition, temperature, residence sequential flow profile sufficiently:
   to reduce the volume concentration of unreacted reactant components in the hot reaction fluid at the system outlet to less than 25 pmvd at a 15% $O_2$ basis;
   to reduce the volume concentration of residual dissociated reaction product in the hot reaction fluid at the system outlet to less than 25 pmvd at a 15% $O_2$ basis; and
   to constrain the volume concentration of byproduct oxidation components formed within the reaction system to less than 25 ppmvd at a 15% $O_2$ basis at the reaction system outlet.

2. The pollutant reduction method of claim 1 wherein the reaction comprises combustion, of fuel fluid comprising a fuel, with oxidant fluid comprising oxygen, diluted by diluent fluid comprising one of water and carbon dioxide, within a combustion system having an upstream primary combustion region and a downstream equilibration system having a first equilibration region; the method comprising:
   generating hot combustion fluid within the primary combustion region;
   equilibrating the hot combustion fluid within the equilibration system for a residence time greater than 0.5 ms;
   reducing the temperature of the hot combustion fluid within the equilibration system by at least 5° C. to less than 1700° C. at the system outlet;
   wherein configuring the fluid composition, temperature, residence sequential flow profile sufficiently:
   to reduce the volume concentration of unburned hydrocarbons (UHC) in the equilibrated reaction fluid at the system outlet to less than 25 pmvd at a 15% $O_2$ basis;
   to reduce the volume concentration of residual carbon monoxide (CO) in the equilibrated fluid at the system outlet to less than 25 pmvd at a 15% $O_2$ basis; and
   to constrain the volume concentration of byproduct nitrogen oxides (NOx) formed within The equilibration system to less than 25 ppmvd at a 15% $O_2$ basis at the system outlet.

3. The method of claim 2, wherein reducing the fluid temperature comprises flowing diluent fluid comprising added water through an inlet to said equilibration region.

4. The method of claim 3, wherein the equilibration residence time of hot combustion fluid in the system increased to accommodate longer equilibration rates for cooler fluids and lower residual oxidant, than with equivalent systems configured for diluents not comprising water.

5. The method of claim 3, wherein the mass delivery flow rate of water added to said equilibration system is greater than 1% of the hot combustion fluid flow.

6. The method of claim 2, wherein the increase in volume concentration of byproduct NOx within the equilibration system is less than 3 ppmvd at a 15% $O_2$ basis.

7. The method of claim 2, wherein volume concentration of carbon monoxide (CO) exiting the equilibration system is less the CO concentration entering the equilibration system.

8. The method of claim 2, wherein the residual volume concentration of carbon monoxide (CO) exiting the equilibration system is less than 5 ppmvd at a 15% $O_2$ basis.

9. The method of claim 1, wherein equilibrating the hot reaction fluid comprises providing a burnout period to oxidize unreacted reactant components to below a prescribed level.

10. The method of claim 1, wherein the primary reaction system comprises a plurality of primary reaction regions in streamwise sequence, the reaction regions having a critical temperature $T_{CRIT}$ at which the reaction is neutrally stable between a self-ignition temperature $T_{IGN}$ and an adiabatic temperature $T_{ADIAB}$ bounding stable and conditionally stable regions, the method comprising the steps of:
    flowing unreacted oxidant, fuel, and diluent fluids into the plurality of primary reaction regions at respective mass delivery flow ratios of unreacted fluids to hot reaction fluid, whereby forming a plurality of mixed hot reaction fluids,
    controlling the mass flow delivery ratios to between 0.25 and 1.50 times the critical delivery flow ratio $R_{CRIT}$ for each of said primary reaction regions;
    controlling the mean temperature of the mixed hot reaction fluid in each of said regions above its ignition temperature and below the adiabatic temperature of oxidant and fuel combustion;
    controlling one of the composition and the temperature of the fluids delivered to said regions to maintain the combustion temperature of the hot reaction fluid exiting the most downstream of said regions to less than 1700° C.;
    characterized in that the volume concentration of byproduct reaction components produced by the method is less than 25 ppmvd at a 15% $O_2$ basis.

11. The method of claim 10, wherein controlling the temperature in said plurality of combustion regions to within 33% and 67% of the temperature range between the ignition temperature and adiabatic reaction of said fluid as it exits said plurality of reaction regions by one of controlling the mass delivery flow ratio, controlling the amount of diluent, controlling the amount of air, and controlling the amount of fuel.

12. The method of claim 10, wherein controlling fluid delivery to maintain said mass delivery flow ratio R to less than the critical delivery flow ratio $R_{CRIT}$ in said plurality of regions; and maintaining the temperature of the hot reaction fluid in said plurality of regions to greater than or equal to the critical temperature $T_{CRIT}$.

13. The method of claim 10, wherein the step of controlling the temperature, includes controlling a temperature in a region within a range including at least some time below the critical temperature $T_{CRIT}$ by controlling the mass delivery flow ratio within a range including at least some time above the critical delivery flow ratio $R_{CRIT}$.

14. The method of claim 10, wherein controlling the temperature comprises increasing the temperature of the hot reaction fluid in one of said plurality of regions by decreasing said mass delivery flow ratio into said region to a level lower than the critical delivery flow ratio $R_{CRIT}$, when the temperature of the hot reaction fluid entering the region is less than the critical temperature $T_{CRIT}$.

15. The method of claim 10, wherein controlling the temperature comprises decreasing the temperature of the hot reaction fluid in one of said plurality of regions by increasing said mass delivery flow ratio into said region to a level higher than the critical flow ratio $R_{CRIT}$, when the temperature of the hot fluid entering the region is greater than the critical temperature $T_{CRIT}$.

16. The method of claim 10, comprising flowing diluent fluid and reactant fluid into one of said regions with a mass delivery flow ratio of diluent to fuel of 150% or more.

17. The method of claim 10, wherein adding unreacted fluids to said plurality of regions comprises controlling the delivery of unreacted fluid into the plurality of regions such that a progressive streamwise integrated delivery flow ratio of said fluid is less than or equal to the progressive integrated critical delivery flow ratio $R_{CRIT}$ for the corresponding fluid compositions.

18. The method of claim 10, wherein controlling the mean fluid temperature in the plurality of regions by controlling the diluent mass delivery flow rate relative to the reaction heat released within the plurality of regions.

19. The method of claim 10, wherein delivering fluids to the reaction regions comprises changing the oxidant to reactant ratio in the mixed reaction fluid from an excess of reactant in an upstream reaction region to an excess of oxidant in a downstream reaction region.

20. The method of claim 1, wherein the temperature of the equilibrated hot reaction fluid as it exits the reaction system is controlled to less than about 1300° C. and greater than about 800° C.

21. The method of claim 1, wherein equilibrating the hot reaction fluid comprises delivering and mixing oxidant fluid with the hot reaction fluid in the equilibration region.

22. The method of claim 1, wherein controlling the delivery of oxidant fluid and reactant fluid into said primary combustion region such that the ratio of oxidant to fuel is less than the stoichiometric ratio.

23. The method of claim 1, wherein at least 75% of said temperature reduction occurs in less than 50% of the streamwise fluid path length of said equilibration region.

24. The method of claim 1, wherein reducing the temperature during equilibration by greater than 100° C.

25. The method of claim 1, comprising controlling delivery of fuel, oxidant, and diluent fluids to progressively combust fuel under fuel "rich" conditions while controlling composition to operate within a combustion stability boundaries and below byproduct or NOx production boundaries.

* * * * *